(12) United States Patent
Takanashi

(10) Patent No.: US 11,675,474 B2
(45) Date of Patent: *Jun. 13, 2023

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Shogo Takanashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,524

(22) Filed: Jun. 21, 2022

(65) Prior Publication Data

US 2022/0326835 A1  Oct. 13, 2022

Related U.S. Application Data

(62) Division of application No. 16/980,756, filed as application No. PCT/JP2018/044859 on Dec. 6, 2018, now Pat. No. 11,397,506.

(30) Foreign Application Priority Data

Jun. 5, 2018  (JP) .................................. 2018-107366

(51) Int. Cl.
*G06F 3/04812* (2022.01)
*G06F 3/04842* (2022.01)
(Continued)

(52) U.S. Cl.
CPC ...... *G06F 3/04812* (2013.01); *G06F 3/04842* (2013.01); *G06F 3/04845* (2013.01); *G06T 5/50* (2013.01); *G06V 40/28* (2022.01)

(58) Field of Classification Search
CPC ....... G06T 11/00; G06T 11/60; G06T 7/0012; G06V 20/40; G06V 30/32; G06V 40/172;
(Continued)

(56) References Cited

U.S. PATENT DOCUMENTS 6,185,591 B1 * 2/2001 Baker .................. G06F 40/166
                                                  715/210
9,706,168 B1    7/2017 Ludwig et al.
(Continued)

FOREIGN PATENT DOCUMENTS

JP  2005-125628 A  5/2005
JP  2011123895 A   6/2011
JP  2015109612 A   6/2015

OTHER PUBLICATIONS

International Search Report dated Mar. 25, 2019 in PCT/JP2018/044859.

*Primary Examiner* — Rayeez R Chowdhury
(74) *Attorney, Agent, or Firm* — Oblon, McClelland, Maier & Neustadt, L.L.P.

(57) ABSTRACT

There is provided an image archiving method for use with a writing target, comprising the steps of receiving a series of captured images of the writing target, detecting difference between first and second candidate received images separated by a predetermined period of time, where additive differences are indicative of writing and subtractive differences are indicative of erasure; upon detecting subtractive difference, temporarily retaining a last candidate image captured prior to the detection, and detecting whether the subtractive difference relative to the retained image exceeds a subtraction threshold amount; and if so, then storing the retained image.

20 Claims, 10 Drawing Sheets

(51) Int. Cl.
*G06F 3/04845* (2022.01)
*G06T 5/50* (2006.01)
*G06V 40/20* (2022.01)

(58) Field of Classification Search
CPC ....... G01N 2021/6439; G01N 21/6428; G01N 21/6458; G01N 2201/12; G01N 2333/47; G01N 33/56966; G01N 33/6875; G06F 3/03545; G06F 3/017; G06F 3/042; G06F 3/0317; G06F 3/0321; G06F 3/038; G06F 40/169; G06F 40/171; G06F 2203/0382; G06F 3/011; G06F 3/0416; G06F 3/1454; G06F 1/3231; G06F 1/3259; G06F 2203/0383; G06F 2203/04104; G06F 2203/04108; G06F 3/0304; G06F 3/0383; G06F 3/039; G06F 3/041; G06F 3/0412; G06F 3/0425; G06F 3/0482; G06F 3/0483; G06F 3/04883; G06F 3/1462; G06F 40/174; G06F 40/18; G06F 40/186; G06F 40/58; G06F 9/451; G06F 16/2282; G06F 2203/04105; G06F 2203/04106; G06F 3/00; G06F 3/0393; G06F 3/0414; G06F 3/04166; G06F 3/0484; G06F 3/0488; G06F 3/1446; G06F 40/177; G06F 9/452

See application file for complete search history.

(56) References Cited

U.S. PATENT DOCUMENTS

| | | |
|---|---|---|
| 10,015,445 B1 | 7/2018 | Ludwig et al. |
| 2004/0039987 A1* | 2/2004 | Coppin ................... G06F 40/10 715/246 |
| 2005/0138541 A1* | 6/2005 | Euchner ................ G06F 40/169 715/205 |
| 2008/0232710 A1 | 9/2008 | Rai |
| 2010/0245563 A1* | 9/2010 | Golovchinsky .......... H04N 7/18 348/135 |
| 2011/0141278 A1* | 6/2011 | Campbell ............... G06T 7/254 348/143 |
| 2011/0145725 A1* | 6/2011 | Campbell ............. G06F 3/0425 715/751 |
| 2014/0245152 A1* | 8/2014 | Carter .................... G11B 27/28 715/720 |
| 2017/0092333 A1* | 3/2017 | Li .......................... G06V 20/46 |
| 2018/0108121 A1* | 4/2018 | McCaughan ........... G06T 7/254 |

* cited by examiner

[Fig. 1]
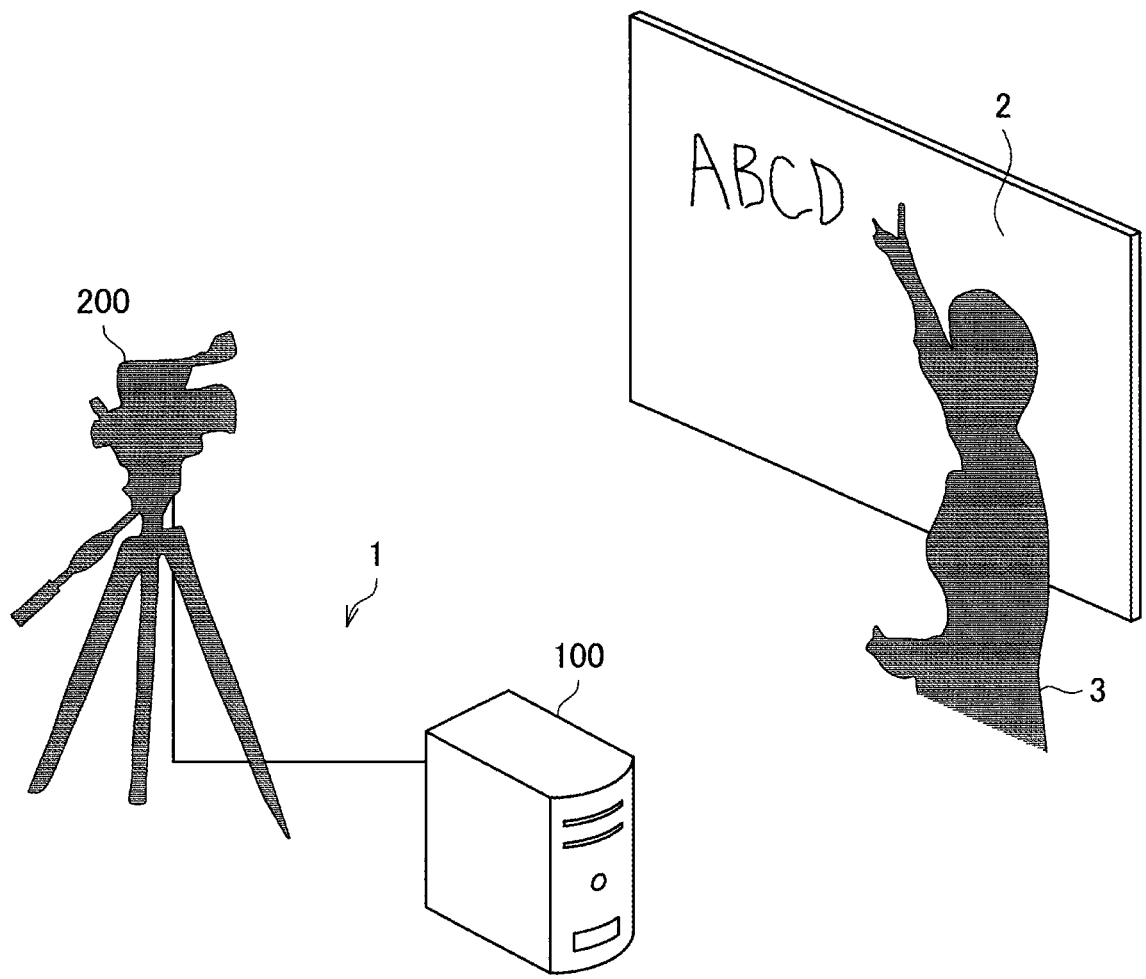

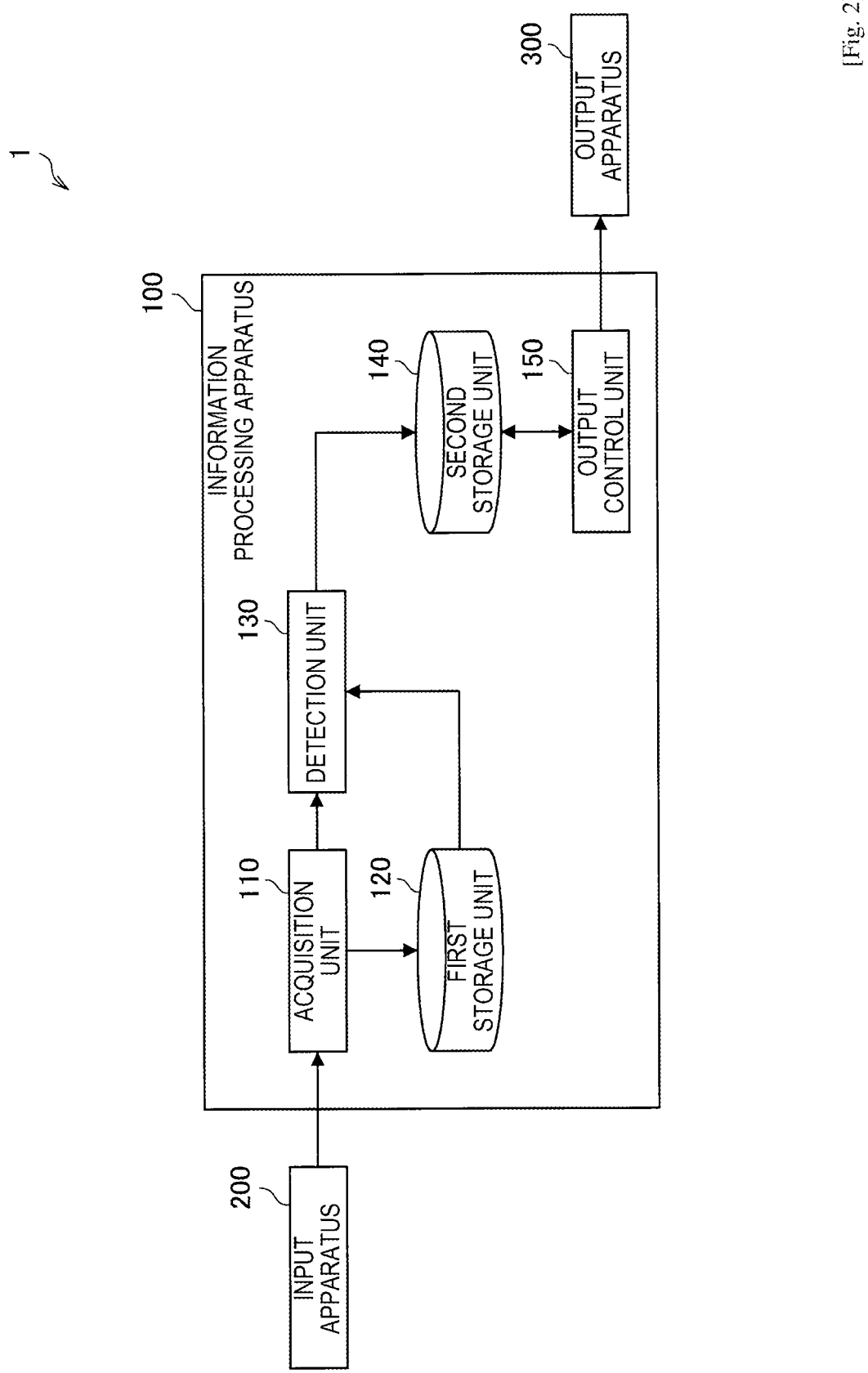

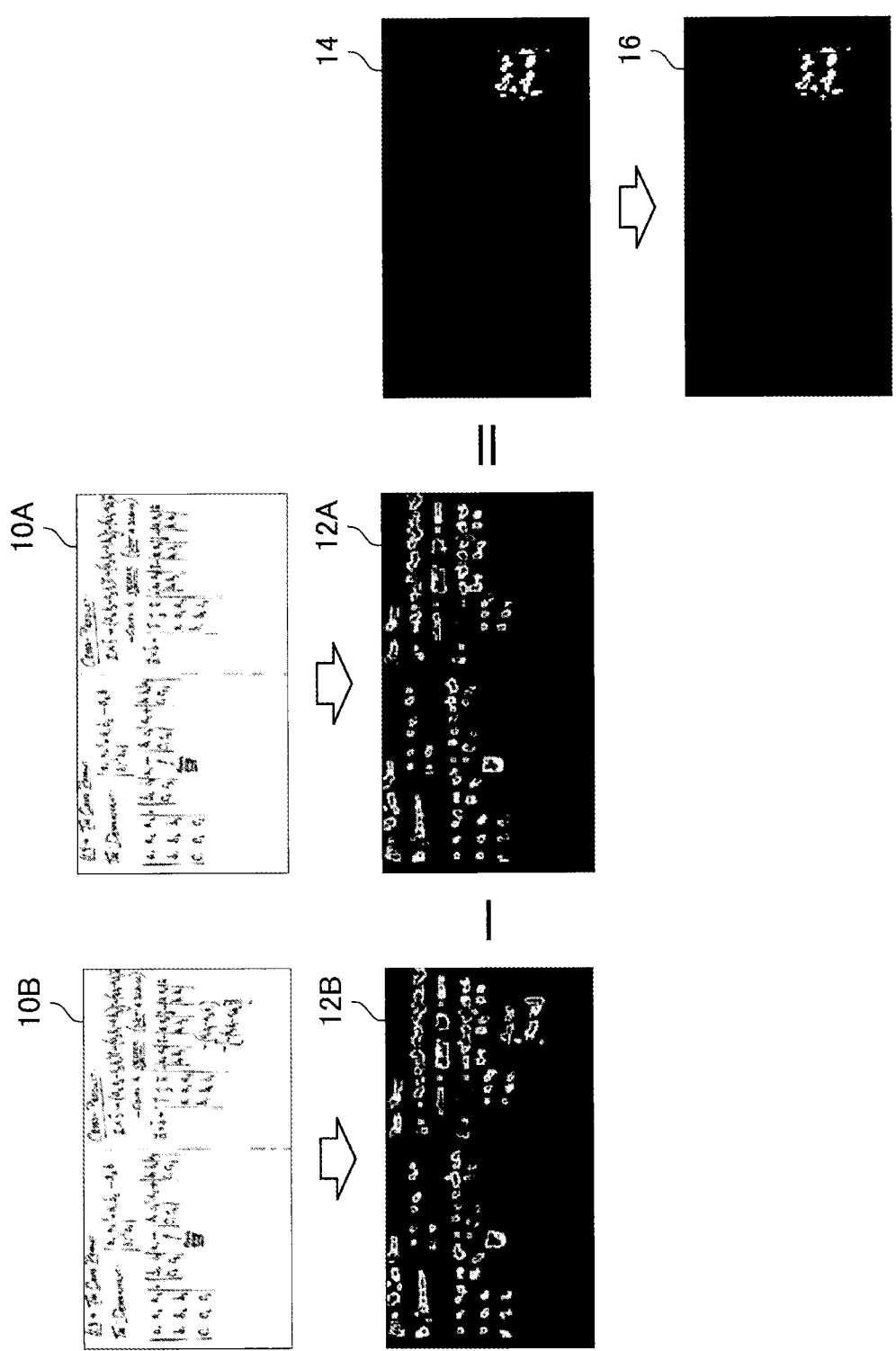
[Fig. 3]

[Fig. 4]
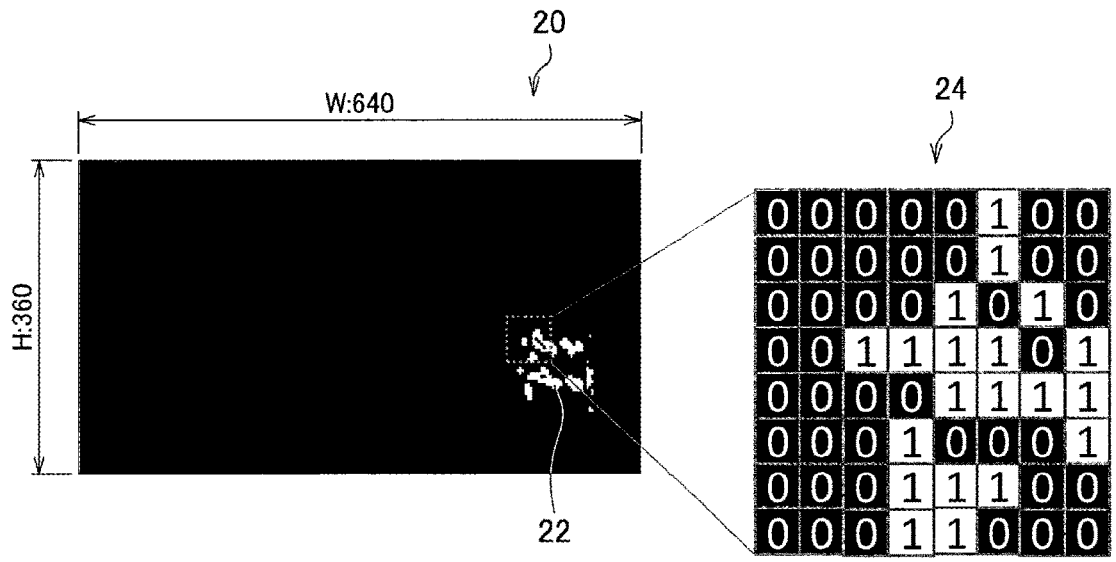
[Fig. 5]
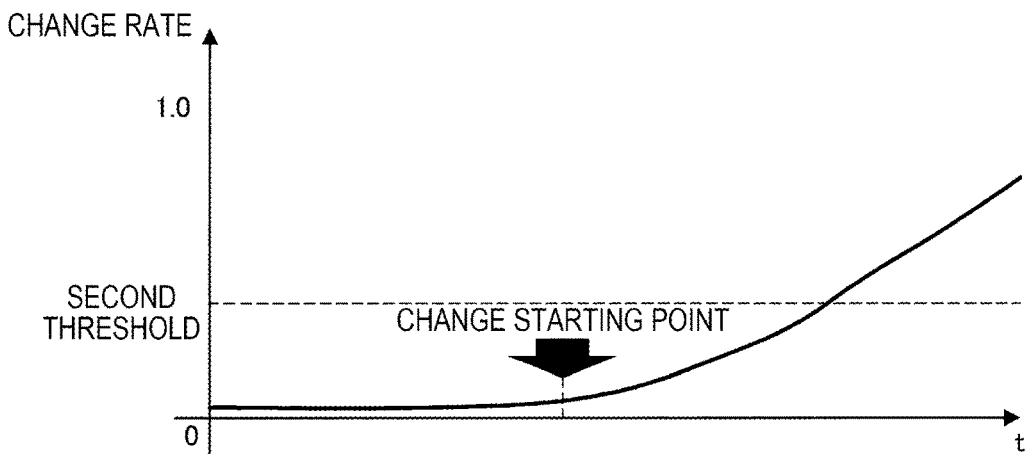
[Fig. 6]
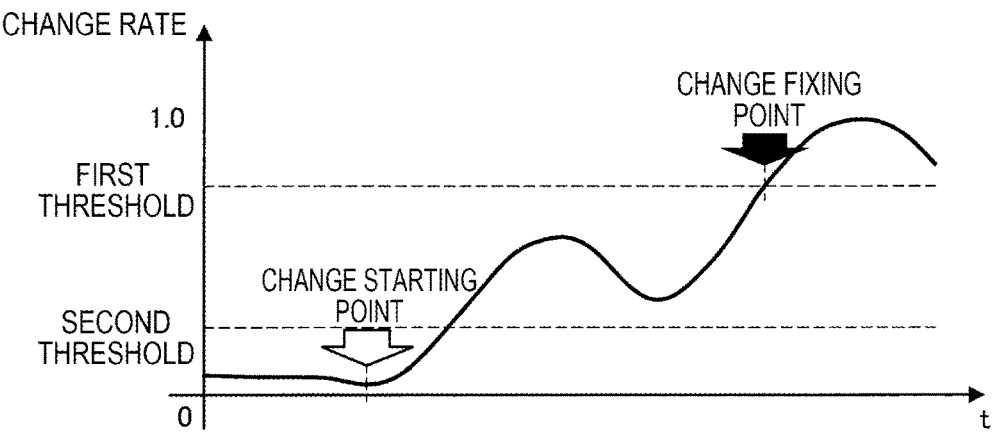

[Fig. 7]
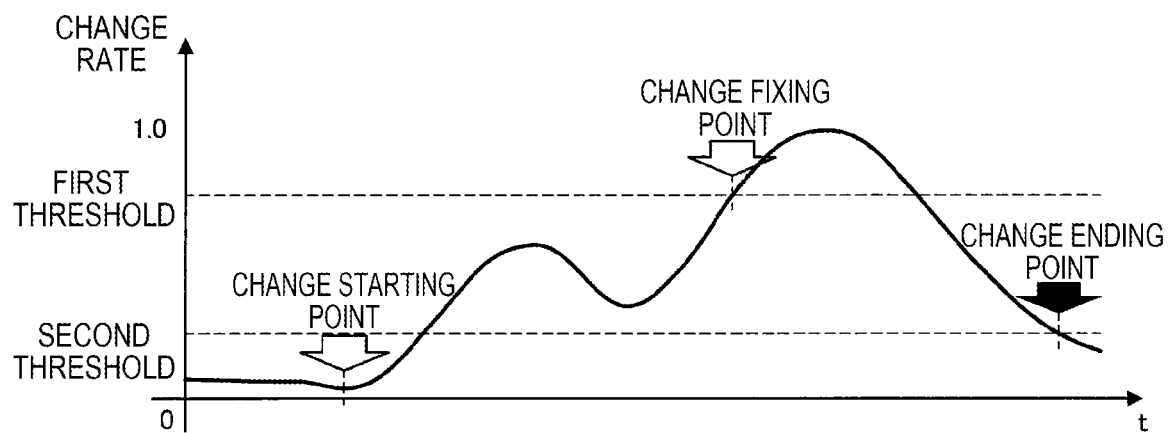
[Fig. 8]
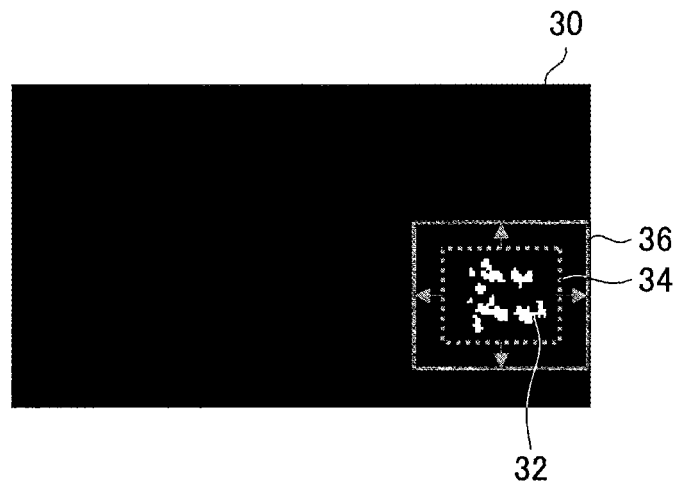

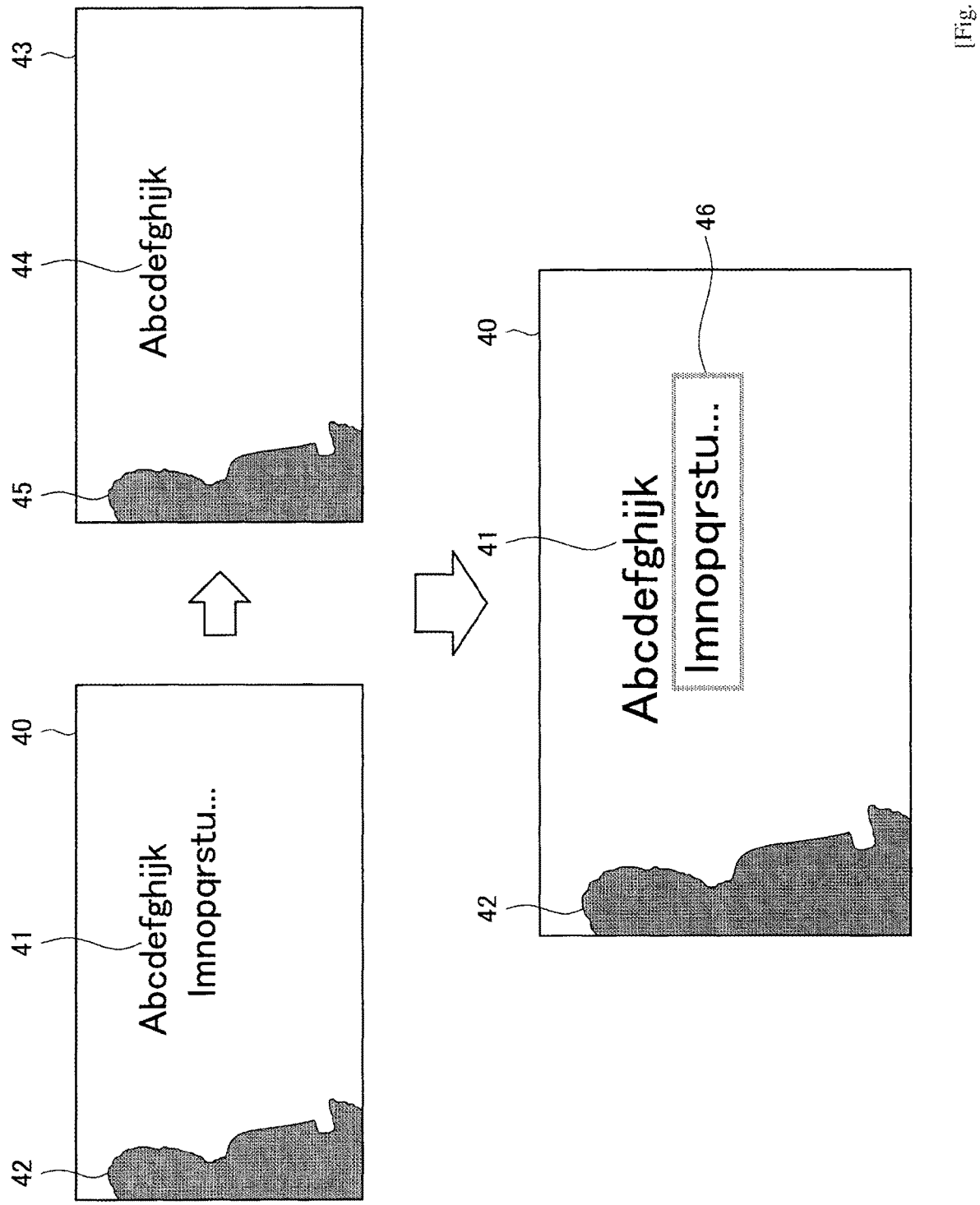

[Fig. 10]
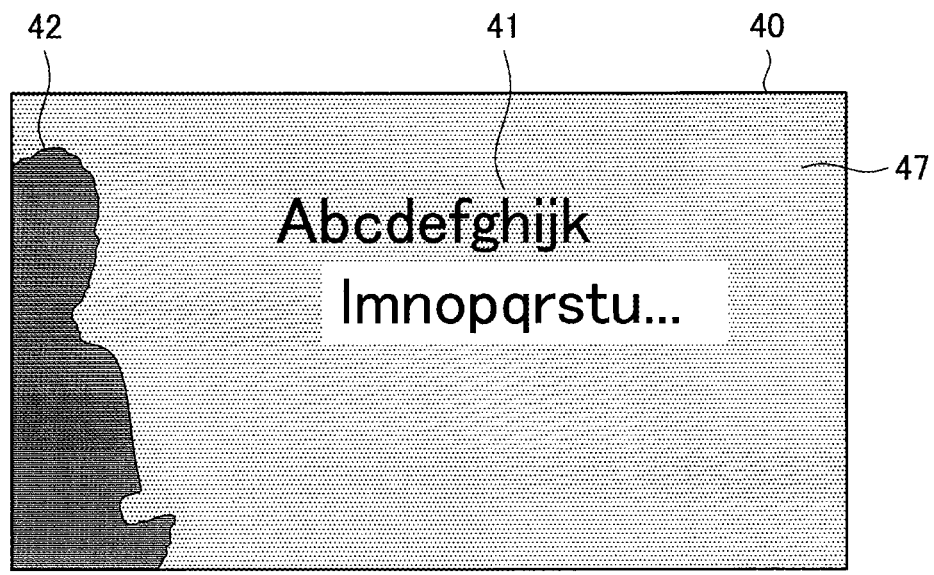
[Fig. 11]
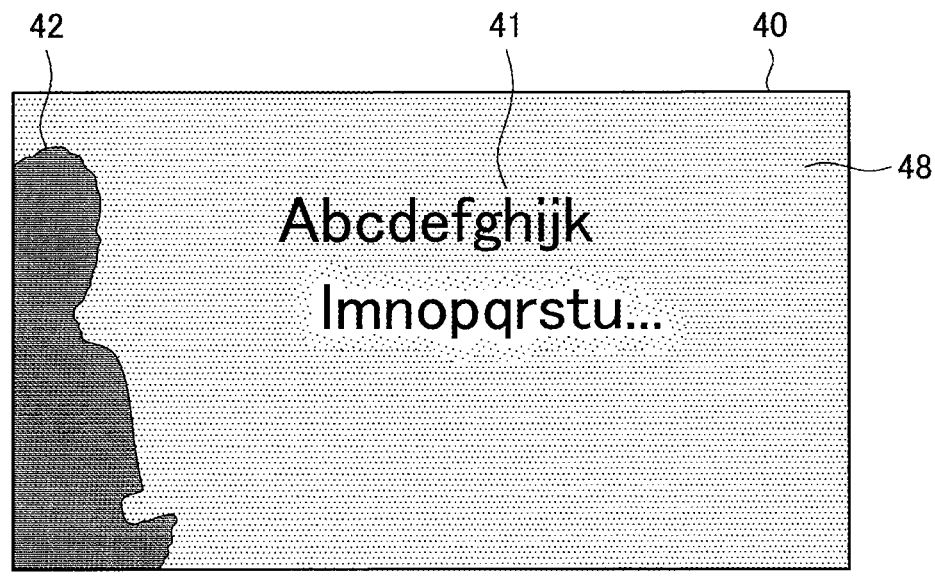

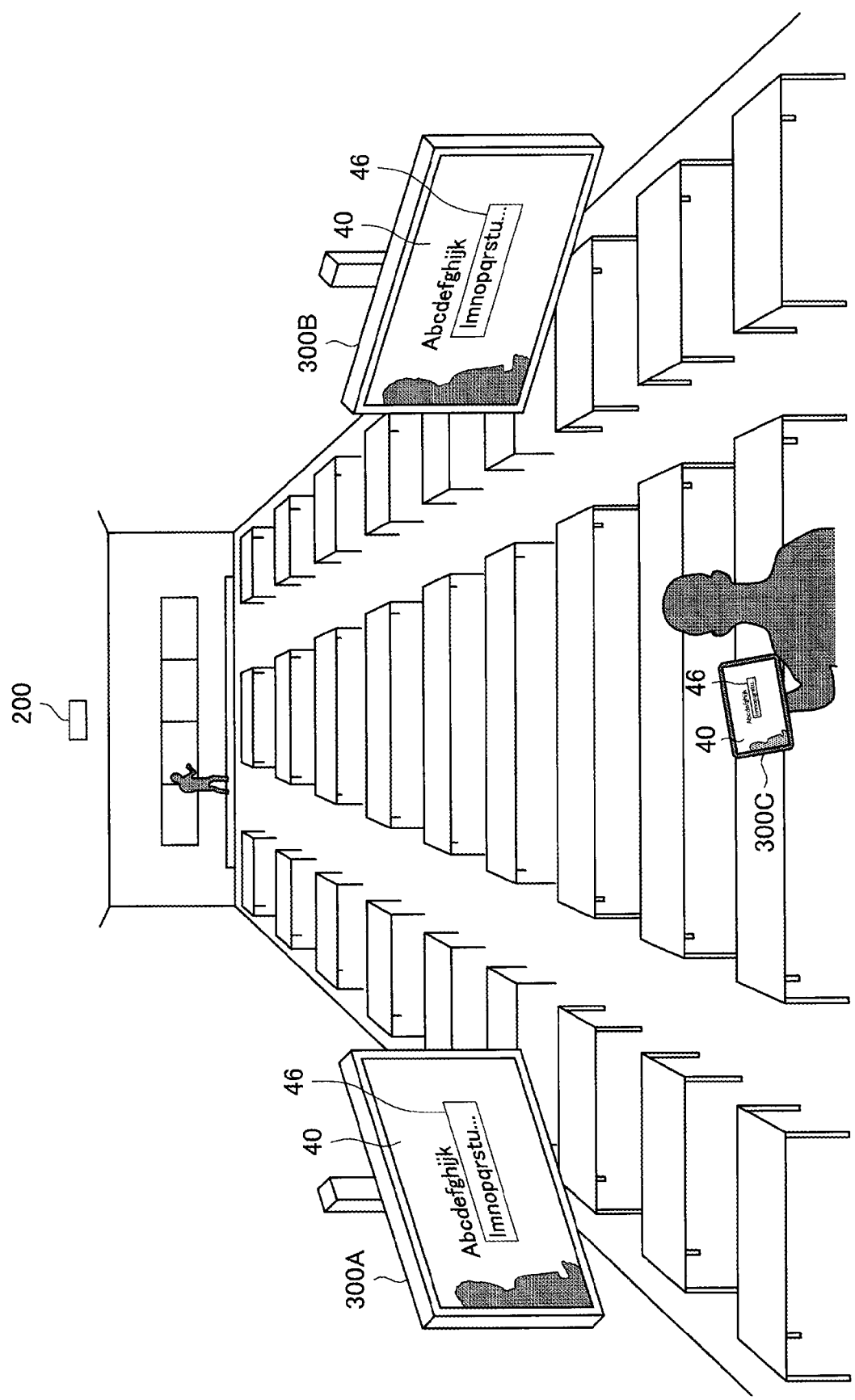

[Fig. 13]
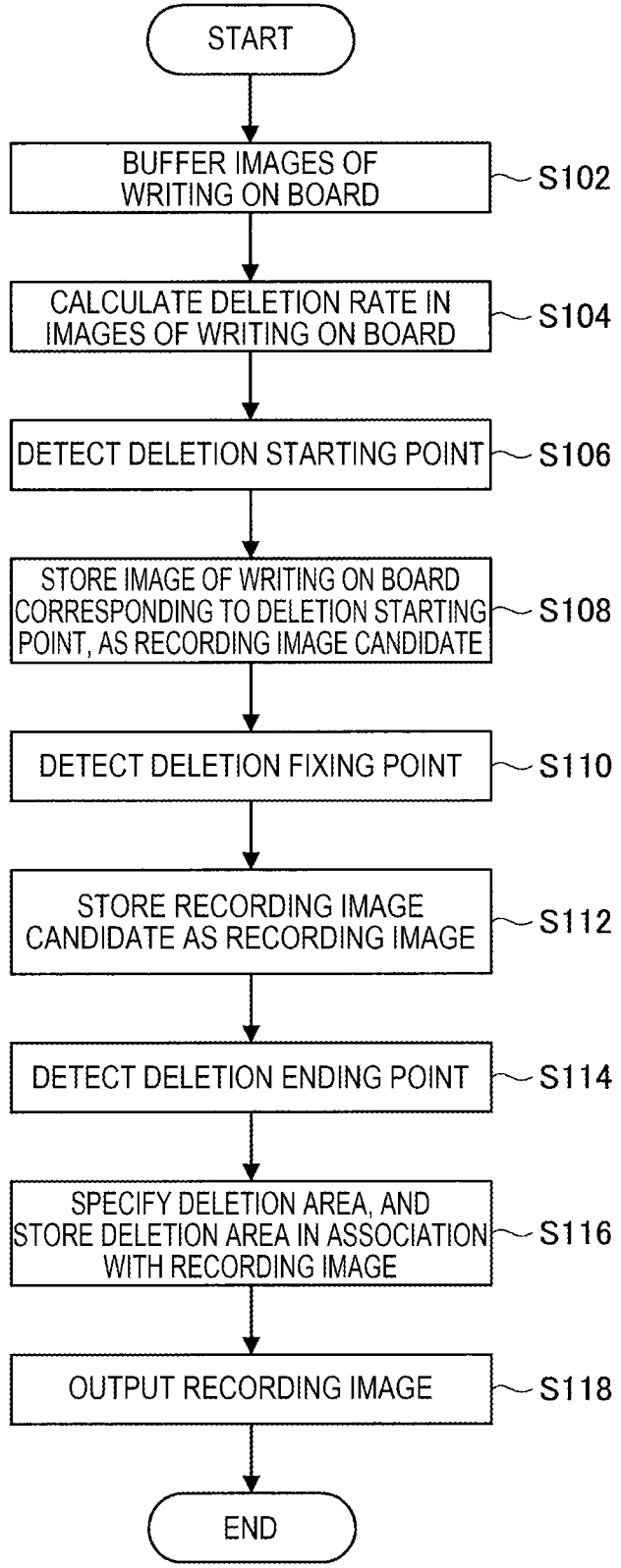

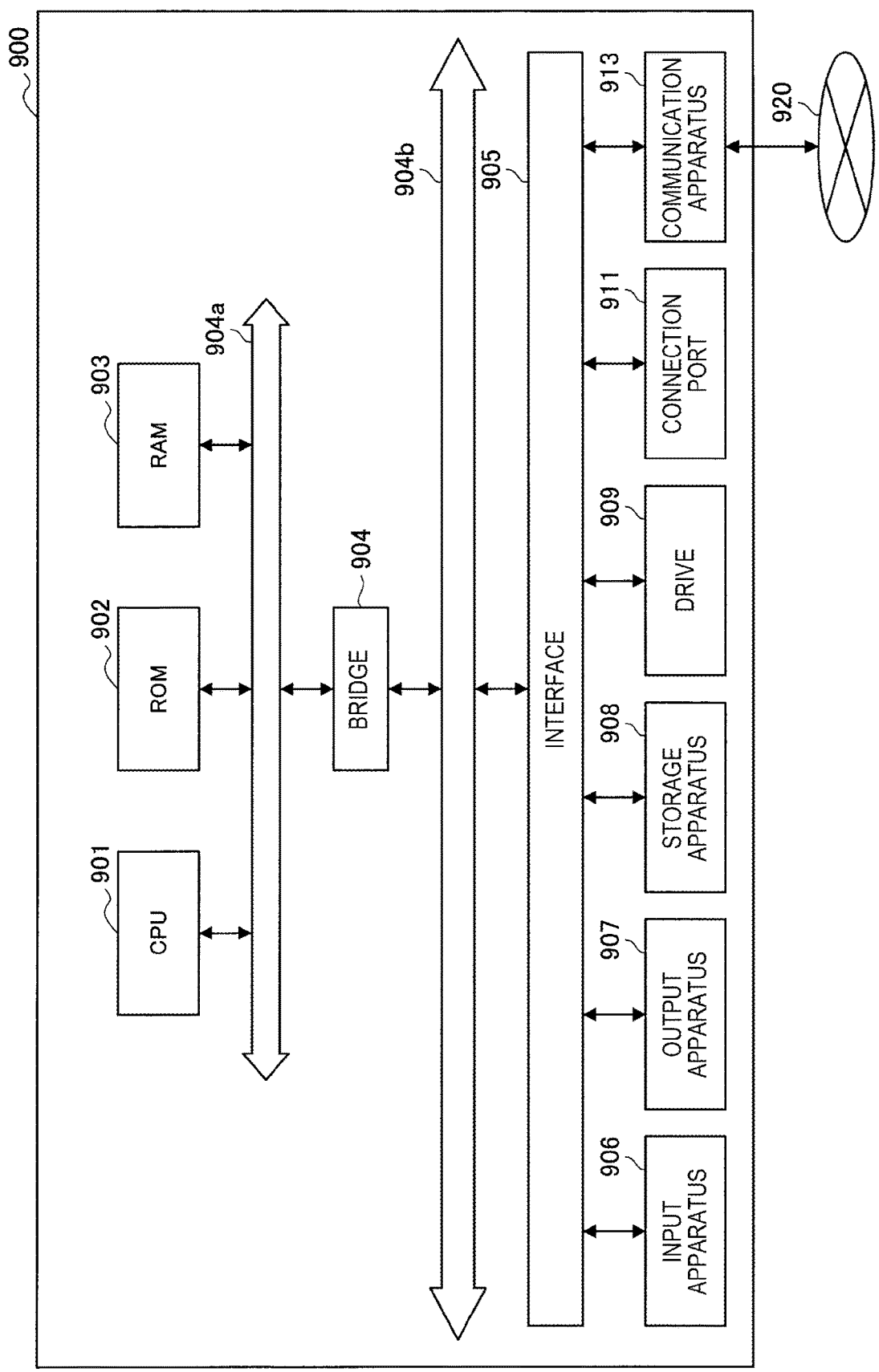
[Fig. 14]

INFORMATION PROCESSING APPARATUS, INFORMATION PROCESSING METHOD, AND PROGRAM

CROSS REFERENCE TO RELATED APPLICATIONS

This application is a divisional application of U.S. application Ser. No. 16/980,756, filed Sep. 14, 2020, which is a National Stage application of PCT/JP2018/044859, filed Dec. 6, 2018, which claims the benefit of Japanese Priority Patent Application JP 2018-107366 filed Jun. 5, 2018. The entire contents of the above-identified applications are incorporated herein by reference.

TECHNICAL FIELD

The present disclosure relates to an information processing apparatus, an information processing method, and a program.

BACKGROUND ART

In general, a meeting, a lecture, or the like goes forward while writing/deleting information on/from a writing target such as a blackboard or a whiteboard. Recording of the information written on the writing target is convenient for later reference. However, continuous recording may be waste of memory capacity. Therefore, a technology of efficiently recording information written on a writing target has been desired.

For example, PTL 1 listed below discloses a technology of causing a digital camera to capture an image of information written on a blackboard when a writer holds (picks up, for example) a blackboard eraser. This enables recording the information written on the blackboard before erasing the information written on the blackboard.

CITATION LIST

Patent Literature

[PTL 1]
JP 2005-125628A

SUMMARY

Technical Problem

However, the information written on the blackboard is not always erased when the writer holds the blackboard eraser. This is because the writer may let go of the blackboard eraser soon after holding it, or the writer may hold the blackboard eraser just to move the blackboard eraser to another position. Therefore, sometimes useless information may be recorded when using the technology described in PTL 1 listed above. In addition, the time interval from when the writer holds the blackboard eraser to when erasure starts is unclear. Therefore, insufficient information may be recorded according to the technology described in PTL 1 listed above. For example, erasure may start before recording.

Accordingly, the present disclosure proposes a mechanism capable of more appropriately recording writing information written on a writing target.

Solution to Problem

According to an embodiment of the present disclosure, there is provided an image archiving method for use with a writing target, comprising the steps of receiving a series of captured images of the writing target, detecting difference between first and second candidate received images separated by a predetermined period of time, where additive differences are indicative of writing and subtractive differences are indicative of erasure; upon detecting subtractive difference, temporarily retaining a last candidate image captured prior to the detection, and detecting whether the subtractive difference relative to the retained image exceeds a subtraction threshold amount; and if so, then storing the retained image.

In addition, according to an embodiment of the present disclosure, there is provided an image archiving method for use with a writing target, comprising the steps of receiving a series of captured images of the writing target, detecting difference between first and second candidate received images separated by a predetermined period of time, where additive differences are indicative of writing and subtractive differences are indicative of erasure; upon detecting additive difference, detecting whether an additive difference between candidate received images exceeds a first addition threshold amount; and if so, then detecting whether an additive difference between candidate received images then falls below a second addition threshold amount; and if so, then storing the candidate received image corresponding to when the additive difference between candidate received images falls below the second addition threshold amount.

In addition, according to an embodiment of the present disclosure, there is provided a playback apparatus for use with a video recording of a writing target, with an input processor adapted to obtain a video sequence of the writing target, an input processor adapted to obtain one or more first timestamps corresponding to timings within the video sequence at which candidate received images were stored according to the method of any preceding claim, an input processor adapted to obtain one or more second respective timestamps for the candidate received images that were stored that respectively corresponding to a change start point preceding the storage of a candidate received image, an playback processor operable to play back the video sequence and at a time in the video sequence corresponding to the second respective timestamp, the playback processor is adapted to overlay on the video the corresponding respective candidate received image that was stored.

Advantageous Effects of Invention

As described above, the present disclosure proposes the mechanism capable of more appropriately recording writing information written on a writing target. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is a diagram illustrating an overview of a system according to an embodiment of the present disclosure.

FIG. 2 is a diagram illustrating an example of the configuration of the system according to the embodiment.

FIG. 3 is a diagram illustrating an example of a comparison process between images of writing on a board according to the embodiment.

FIG. 4 is a diagram illustrating a calculation example of a change rate of writing information according to the embodiment.

FIG. 5 is a graph illustrating an example of detection of a change starting point according to the embodiment.

FIG. 6 is a graph illustrating an example of detection of a change fixing point according to the embodiment.

FIG. 7 is a graph illustrating an example of detection of a change ending point according to the embodiment.

FIG. 8 is a diagram illustrating an example of specifying a change area according to the embodiment.

FIG. 9 is a diagram illustrating an output example of a recording image according to the embodiment.

FIG. 10 is a diagram illustrating an output example of a recording image according to the embodiment.

FIG. 11 is a diagram illustrating an output example of a recording image according to the embodiment.

FIG. 12 is a diagram illustrating an output example of a recording image according to the embodiment.

FIG. 13 is a flowchart illustrating an example of a workflow of a recording process of an image of writing on a board performed by an information processing apparatus according to an embodiment.

FIG. 14 is a block diagram illustrating an example of a hardware configuration of an information processing apparatus according to the embodiment.

DESCRIPTION OF EMBODIMENTS

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, the description is given in the following order.
1. Introduction
2. Configuration example
3. Technical features
3.1. Buffering of image of writing on board
3.2. Detection of change in writing information
3.3. Recording of image of writing on board
3.4. Specification of change area
3.5. Output of recording image
3.6. Workflow of process
3.7. Modifications
4. Hardware configuration example
5. Conclusion

1. INTRODUCTION

First, an overview of a system according to an embodiment of the present disclosure will be described with reference to FIG. 1.

FIG. 1 is a diagram illustrating an overview of a system according to an embodiment of the present disclosure. As illustrated in FIG. 1, a system 1 includes an information processing apparatus 100 and an input apparatus 200 connected to the information processing apparatus 100.

A writing target 2 is an object on which visual information (hereinafter, referred to as writing information) is written such as dots, lines, words, sentences, mathematical formulas, signs, drawings, geometric shapes, or images. The writing target 2 is a blackboard, a whiteboard, an electronic paper, a touchscreen, or the like. The writing information is written on the writing target 2 in chalk, marker pen, stylus, finger, or the like, and is erased from the writing target 2 by using a blackboard eraser, an eraser, or the like. Sometimes the writing target 2 may also be referred to as a writing surface.

A writer 3 is a person who makes motions with respect to the writing target 2. The writer 3 writes the writing information on the writing target 2 and erases the writing information written on the writing target 2. In a lecture, a meeting, or the like, the writer 3 typically explains the writing information while pointing to the writing information written on the writing target 2 by using his/her hand or a pointer held in his/her hand such as a pointing stick or a laser pointer.

The input apparatus 200 is an apparatus configured to input information related to a physical space in which the input apparatus 200 is installed. For example, the input apparatus 200 includes an imaging apparatus and a sound input apparatus. The imaging apparatus includes a lens system, a drive system, and solid state image sensor array, and the like. The lens system includes an imaging lens, a diaphragm, a zoom lens, a focus lens, and the like. The drive system causes the lens system to carry out focus operation and zoom operation. The solid state image sensor array performs photoelectric conversion on imaging light acquired by the lens system to generate an imaging signal. The sound input apparatus includes a microphone configured to collect ambient sound, a microphone amplifier circuit configured to perform an amplification process on a sound signal obtained by the microphone, an A/D converter, and a signal processing circuit such as a noise canceller. The input apparatus 200 outputs image data and sound data obtained when capturing the image, as digital signals.

The input apparatus 200 is capable of capturing an image while using an object in the physical space as a subject. According to the present embodiment, the input apparatus 200 uses the writing target 2 on which the writing information is written as a subject, captures an image in the physical space, associates the captured image with an image capturing time, and outputs the image to the information processing apparatus 100. Note that, the captured image may include something other than the writing target 2. In this case, the input apparatus 200 outputs an image acquired based on the captured image, to the information processing apparatus 100. Here, the image acquired based on the captured image is an image obtained by extracting an area including the writing target 2 from the captured image, for example. The writing target 2 may include the functions of the input apparatus 200. For example, the input apparatus 200 and the writing target 2 may be implemented as an interactive whiteboard configured to scan a state of the writing target 2, acquires an image, and output the image. In this case, the input apparatus 200 acquires an image of the writing target 2, associates the acquired image with an acquisition time, and outputs the image to the information processing apparatus 100.

The image input by the input apparatus 200 may be a moving image. The moving image is data including a plurality of still images (image data) and reproduction times of the respective still images (corresponding to image capturing times). Reproduction of the moving image is sequential reproduction of the still images in order of reproduction time. The still images included in the moving image are also referred to as frames. The number of frames per unit time is also referred to as a frame rate, and is represented by the number of frames per second (FPS: frames per second).

The image input by the input apparatus 200 may be a still image. In this case, the input apparatus 200 sequentially inputs images. In the present specification, the number of images input per unit time is also referred to as a frame rate like the case of the moving image.

Next, the image of the writing target 2 on which the writing information is written is also referred to as an image of writing on a board. The image of the writing target 2 is input by the input apparatus 200. The image of writing on the board is assumed to be a still image. If the image input by the input apparatus 200 is a moving image, an image of writing on the board is one still image included in the moving image.

The information processing apparatus 100 selectively records an image of writing on the board to be recorded among images of writing on the board input by the input apparatus 200. In the present specification, recording means storing of information on a storage medium/recording medium. The information processing apparatus 100 monitors the images of writing on the board, detects that the writing information written on the writing target 2 is changed, and records an image of writing on the board obtained before or after the change starts. As described above, the image of writing on the board to be selectively recorded based on change in the writing information, may be referred to as a recording image.

The change in the writing information may be deletion of the writing information. In this case, the information processing apparatus 100 may record an image of writing on the board obtained before the deletion starts, as a recording image. Typically, the largest amount of writing information is written on the writing target 2 obtained before deletion of the writing information starts. Therefore, it is possible to reduce useless recording and efficiently record images of writing on a board by selectively recording the images of writing on the board obtained before deletion starts.

The change in the writing information may be writing (in other words, addition) of the writing information. In this case, the information processing apparatus 100 may record an image of writing on the board obtained after the addition ends, as a recording image. Typically, the largest amount of writing information is written on the writing target 2 obtained after the addition of writing information ends. Therefore, it is possible to reduce useless recording and efficiently record images of writing on a board by selectively recording the images of writing on the board obtained after addition ends.

2. CONFIGURATION EXAMPLE

FIG. 2 is a diagram illustrating an example of the configuration of the system 1 according to the present embodiment. As illustrated in FIG. 2, the system 1 includes the information processing apparatus 100, the input apparatus 200, and an output apparatus 300.

As described above, the input apparatus 200 sequentially inputs images of writing on the board, and outputs the images to the information processing apparatus 100.

The output apparatus 300 is an apparatus configured to output information under the control of the information processing apparatus 100. The output apparatus 300 may be implemented by a display apparatus such as a CRT display apparatus, a liquid crystal display apparatus, a plasma display apparatus, an EL display apparatus, a laser projector, an LED projector, or a lamp. For example, the output apparatus 300 outputs the recording image.

The information processing apparatus 100 is an apparatus configured to control entire operation of the system 1. The information processing apparatus 100 is implemented by any apparatus such as a personal computer (PC), a smartphone, or a tablet terminal. As illustrated in FIG. 2, the information processing apparatus 100 includes an acquisition unit 110, a first storage unit 120, a detection unit 130, a second storage unit 140, and an output control unit 150. Such structural elements can be treated as a control unit configured to control entire operation of the system 1.

The acquisition unit 110 has a function of acquiring images of writing on a board input by the input apparatus 200. The first storage unit 120 has a function of temporarily storing the acquired images of writing on the board. The detection unit 130 has a function of detecting change in writing information written on the writing target 2, by comparing an image of writing on the board acquired by the acquisition unit 110 at the current time with an image of past writing on the board stored in the first storage unit 120. The second storage unit 140 has a function of a record control unit configured to perform control such that an image of writing on the board to be recorded is specified on the basis of information detected by the detection unit 130 and the specified image of writing on the board to be recorded is recorded, and a function of a storage medium configured to store the specified image of writing on the board. In addition, the second storage unit 140 stores various kinds of information related to the image of writing on the board. The output control unit 150 has a function of generating output information on the basis of the image of writing on the board stored in the second storage unit 140 and causing the second storage unit 140 to store the output information or causing the output apparatus 300 to output the output information.

Details of the operation process performed by the information processing apparatus 100 will be described later.

3. TECHNICAL FEATURES

3.1. Buffering of Image of Writing on Board

The first storage unit 120 buffers the images of writing on the board input by the input apparatus 200. The buffering is performed so as to hold images of past writing on the board that are used for detecting change in the writing information (to be described later).

3.2. Detection of Change in Writing Information

The detection unit 130 detects change in writing information written on the writing target 2. Specifically, the detection unit 130 detects change in writing information written on a writing target by comparing an image of writing on a board obtained at a detection target timing (also referred to as a first image of writing on the board) with an image of past writing on the board obtained at a timing a predetermined period of time before the detection target timing (also referred to as a second image of writing on the board). As an example of detection of change in the writing information written on the writing target 2, the detection unit 130 detects information (corresponding to change information) related to the change in the writing information written on the writing target. Here, an image of writing on a board obtained at a certain timing means an image of writing on the board input by the input apparatus 200 at the certain timing. The detection unit 130 detects information related to change in writing information each time an image of writing on the board is input to the input apparatus 200. The detection target timing is a time when the first image of writing on the board is input (such as the image capturing time). Hereinafter, the detection target timing is also referred to as the current time.

The detected information related to change includes the amount of change in the writing information written on the writing target 2, a change starting point that is a timing at which the change in the writing information starts, a change fixing point that is a timing at which the change in the writing information is fixed, and a change ending point that is a timing at which the change in the writing information ends. Note that, the change may be deletion of the writing information or may be addition of the writing information. Next, a method of detecting pieces of information will be described in detail.

(1) Calculation of Amount of Change

The detection unit 130 acquires the first image of writing on the board from the acquisition unit 110, and acquires the second image of writing on the board from the first storage unit 120. The first image of writing on the board is input by the input apparatus 200 at the current time, and the second image of writing on the board is input by the input apparatus 200 in the past. Next, the detection unit 130 detects the amount of change in the writing information from the past to the current time by comparing the first image of writing on the board with the second image of writing on the board. Here, the second image of writing on the board may be an image of writing on the board input by the input apparatus 200 a predetermined period of time before in the past. In this case, it is possible to detect the amount of change in the writing information from the time the predetermined period of time before in the past to the current time. In other words, the amount of change is the amount of change in the writing information per predetermined period of time. In addition, the amount of change may be considered as a change speed. The predetermined period of time is a time interval in which change in writing information can be recognized in the case where the writing information is deleted or added. A standard time interval is about three seconds. In other words, a buffering period of the images of writing on the board to be buffered by the first storage unit 120 is about three seconds. Note that, the buffering period of three seconds is a mere example, and the present disclosure is not limited thereto. In addition, the second image of writing on the board may be an image of writing on the board input by the input apparatus 200 at a predetermined timing in the past. In this case, it is possible to detect the amount of change in the writing information from the predetermined timing in the past to the current time. The predetermined timing is a fixed timing, but may be changed on the basis of a predetermined condition. In other words, the second image of writing on the board may be updated on the basis of the predetermined condition. For example, the second image of writing on the board may be updated every 30 seconds.

First, the detection unit 130 compares the first image of writing on the board with the second image of writing on the board, and obtains a difference image including information indicating pixels changed between the two images (hereinafter, also referred to as changed pixels). Next, with reference to FIG. 3, a comparison process will be described. The comparison process is performed between images of writing on a board in the case where the change in the writing information is deletion of the writing information.

FIG. 3 is a diagram illustrating an example of the comparison process between images of writing on the board according to the present embodiment. As illustrated in FIG. 3, it is assumed that a first image 10A of writing on a board and a second image 10B of writing on the board are acquired. The detection unit 130 performs a binarization process on each of the first image 10A of writing on the board and the second image 10B of writing on the board. The binarization process is a process of converting a color image, a grayscale image, or the like into a binary image. In the example illustrated in FIG. 3, pixels of the writing target 2 on which the writing information is written (hereinafter, also referred to as writing pixels) are converted into white (such as 1), and the other pixels (hereinafter, also referred to as board surface pixels) are converted into black (such as 0). The detection unit 130 obtains a difference image 14 showing deleted writing information by taking the difference between a first image 12A of writing on the board obtained after the binarization process and a second image 12B of writing on the board obtained after the binarization process, the second image 12B serving as a criterion. In the difference image 14, the pixels that are changed, in other words, pixels in which the deleted writing information was written (that is, changed pixels) are white, and the other pixels are black. Here, sometimes the changed pixels that have been acquired may include pixels affected by noise generated during the binarization. Accordingly, the detection unit 130 removes the noise from the difference image 14 and obtains a difference image 16 including changed images with higher extraction accuracy.

Note that, in the case where the change in the writing information is addition of writing information, the detection unit 130 obtains a difference image showing added writing information by taking the difference between a first image of writing on the board obtained after the binarization process and a second image of writing on the board obtained after the binarization process, the first image serving as a criterion. In the difference image, the pixels that are changed, in other words, pixels in which the added writing information is written (that is, changed pixels) are white, and the other pixels are black, for example. Noise thereof is removed in a way similar to the case where the change in the writing information is deletion of writing information.

After the comparison process between images of writing on the board, the detection unit 130 calculates the amount of change in writing information on the basis of the acquired difference image. The amount of change is a value based on the number of changed pixels. For example, the amount of change is a ratio of the changed pixels to the whole writing target 2 (hereinafter, also referred to as a change rate). Note that, the change rate is also referred to as a deletion rate in the case where change in the writing information is deletion of the writing information. In the case where change in the writing information is addition of the writing information, the change rate is also referred to as an addition rate. In addition, the amount of change may be the number of changed pixels itself, or may be the number of words or the like that are deleted or added. Hereinafter, the amount of change in writing information is assumed to be a change rate of the writing information.

FIG. 4 is a diagram illustrating a calculation example of a change rate of writing information according to the present embodiment. As illustrated in FIG. 4, the size of a difference image 20 is assumed to be 640 pixels in width and 360 pixels in height. The detection unit 130 counts the number of changed pixels 22 in the difference image 20. As illustrated in an enlarged image 24 obtained by partially enlarging a part including the changed pixels 22, the number of changed pixels 22 is the number of white (in other words, 1) pixels in the difference image 20. If the number of changed pixels 22 in the difference image 20 is 12000, a change rate is calculated using the following equation.

[Math. 1]

$$\text{Change rate } E = 12000/(640 \times 360) \quad (1)$$
$$= 0.05$$

The detection unit 130 calculates a change rate each time an image of writing on the board is input, and monitors chronological change in the change rate. In this case, the detection unit 130 may smooth the change rate by using a change rate calculated in the past. This enables smoothing chronological change in the change rate and suppressing occurrence of outliers. Therefore, it is possible to suppress false detection when detecting a change starting point, a change fixing point, and a change ending point (to be described later). For example, the change rate is smoothed through weighted addition such as the following equation.

$$E_c' = \alpha \cdot E_c + (1-\alpha) \cdot E_p \quad (2)$$

Here, $E_c'$ represents a smoothed change rate, $E_c$ represents a change rate at the current time, and $E_p$ represents a past change rate. In a next time, $E_c'$ at the current time is used as $E_p$. $\alpha$ represents a reflection rate of the change rate at the current time. $\alpha$ is a value that is not less than 0 and not more than 1.

The detection unit 130 detects that change starts, change is fixed, and the change ends on the basis of chronological change in the change rate.

(2) Detection of Change Starting Point

The detection unit 130 detects a change starting point (corresponding to a first timing) on the basis of chronological change in a change rate of writing information written on the writing target 2. Specifically, the detection unit 130 detects the change starting point on the basis of a second threshold and a predetermined gradient of the change rate. More specifically, in the case where the change rate is the second threshold or less, the detection unit 130 detects a timing at which the chronological change in the change rate has the predetermined gradient, as the change starting point. This enables detection of a timing at which deletion or addition of writing information has possibly started. Typically, the predetermined gradient is a positive gradient. This is because the positive gradient of chronological change in the change rate indicates that deletion or addition of writing information has possibly started. The predetermined gradient becomes a negative gradient in the case where the change rate is multiplied by a negative coefficient or the like. Note that, the change starting point is detected so as to specify an image of writing on the board obtained before the change starts.

FIG. 5 is a graph illustrating an example of detection of a change starting point according to the present embodiment. In the graph illustrated in FIG. 5, a horizontal axis represents time, while a vertical axis represents change rates. Typically, the time represented by the horizontal axis is an input time (for example, image capturing time) of an image of writing on a board. As illustrated in FIG. 5, the graph shows that writing information written on the writing target 2 is gradually changed (deleted or added, for example) and the change rate increases over time. In addition, a timing at which positive change occurs in the gradient of the change rate in a range in which the change rate is the second threshold or less, is detected as the change starting point. The second threshold is decided on the basis of a change rate that has been stably obtained in the case where the change has not occurred (for example, the change rate is very close to zero and is a positive value due to an effect of some noise).

(3) Detection of Change Fixing Point

After the detection of the change starting point, the detection unit 130 determines whether or not the change in the writing information is temporary change on the basis of a result of comparison between the amount of change and a first threshold. Specifically, the detection unit 130 detects a timing at which the change rate exceeds the first threshold, as the change fixing point. Subsequently, the detection unit 130 determines that the change in the writing information is not temporary change in the case where the change fixing point is detected, and the detection unit 130 determines that the change in the writing information is temporary change in the case where the change fixing point is not detected. Here, the case where the change fixing point is not detected means a case where a case where the change starting point is detected again or a change ending point (to be described later) is detected while the change rate does not exceed the first threshold. By determining that the change in the writing information is not temporary, it is confirmed that a predetermined amount of change (deletion or addition) occurs within a predetermined period of time, and it is possible to adjust the predetermined amount by using the first threshold. Note that, the first threshold is a value larger than the second threshold.

FIG. 6 is a graph illustrating an example of detection of the change fixing point according to the present embodiment. In the graph illustrated in FIG. 6, a horizontal axis represents time, while a vertical axis represents change rates. Typically, the time represented by the horizontal axis is an input time (for example, image capturing time) of the image of writing on the board. The graph illustrated in FIG. 6 shows a situation a certain period of time after the graph illustrated in FIG. 5. As illustrated in FIG. 6, the graph shows that the writing information written on the writing target 2 is changed and the change rate varies over time after the change starting point. In addition, a timing at which the change rate exceeds the first threshold is detected as the change fixing point.

(4) Detection of Change Ending Point

After determining that the change in the writing information is not temporary, the detection unit 130 detects a change ending point (corresponding to a second timing) on the basis of a result of comparison between the change rate and the second threshold. Specifically, after detecting the change fixing point, the detection unit 130 detects a timing at which the change rate becomes the second threshold or less, as the change ending point. Note that, the change ending point is detected so as to specify an image of writing on the board obtained after a series of changes ends.

FIG. 7 is a graph illustrating an example of detection of the change ending point according to the present embodiment. In the graph illustrated in FIG. 7, a horizontal axis represents time, while a vertical axis represents change rates. Typically, the time represented by the horizontal axis is an input time (for example, image capturing time) of the image of writing on the board. The graph illustrated in FIG. 7 shows a situation a certain period of time after the graph illustrated in FIG. 6. As illustrated in FIG. 7, the change rate reaches a peak after the change fixing point, and the change rate decreases over time. Subsequently, a timing at which the change rate becomes the second threshold or less is detected as the change ending point.

(5) Setting of Threshold

The detection unit 130 detects change in the writing information written on the writing target 2 each time an image of writing on the board is acquired. Specifically, the detection unit 130 detects information related to the change in the writing information written on the writing target 2 each time an image of writing on the board is acquired. In this case, the detection unit 130 may set the first threshold and the second threshold in accordance with intervals of the acquisition of the image of writing on the board. Specifically, the detection unit 130 may set the first threshold and the second threshold on the basis of a frame rate. The detection unit 130 sets the first threshold and the second threshold to higher values as the frame rate increases. This is because the gradient of chronological change in the change rate becomes steeper as the frame rate increases. On the other hand, the detection unit 130 sets the first threshold and the second threshold to lower values as the frame rate decreases. This is because the gradient of chronological change in the change rate becomes milder as the frame rate decreases. According to such settings, it is possible to improve detection accuracy of the change starting point, the change fixing point, and the change ending point.

3.3. Recording of Image of Writing on Board

The second storage unit 140 specifies information indicating the writing target 2 including the writing information (such as an image of writing on the board) on the basis of change in the writing information detected by the detection unit 130. Specifically, the second storage unit 140 specifies the information indicating the writing target 2 in the case where it is determined that the change in the writing information is not temporary. Subsequently, the second storage unit 140 stores the specified information indicating the writing target 2. In other words, the detection unit 130 causes the second storage unit 140 to store the information indicating the writing target 2 on the basis of the information detected by the detection unit 130. Here, the information indicating the writing target 2 to be stored is an image of writing on the board.

(1) Case of Deletion

Next, a case where change in writing information is deletion of the writing information will be described. In this case, the change starting point, the change fixing point, the change ending point may also be referred to as a deletion starting point, a deletion fixing point, and a deletion ending point, respectively.

In the case where the deletion starting point is detected, the second storage unit 140 stores the image of writing on the board corresponding to the deletion starting point, as a recording image candidate. Here, an image of writing on the board corresponding to a certain timing is not always an image of writing on the board input by the input apparatus 200 at the certain timing. The image of writing on the board corresponding to the certain timing may be an image of writing on the board obtained at a timing a predetermined period of time before/after the certain timing. For example, an image of writing on the board corresponding to the deletion starting point is to be stored as the recording image candidate, and the image of writing on the board corresponding to the deletion starting point is a past image (in other words, a second image of writing on the board) used in the comparison process between images of writing on the board for calculating a deletion rate at the deletion starting point. Accordingly, it is possible to certainly use the image of writing on the board obtained before the deletion starts, as the recording image candidate. Typically, the image of writing on the board obtained before deletion of writing information starts shows the writing target 2 on which the largest amount of writing information is written. Note that, the recording image candidate is an image capable of serving as a recording image.

In the case where the deletion fixing point is detected after detection of the deletion starting point, the second storage unit 140 specifies and stores the recording image candidate as a recording image. The recording image candidate is the image of writing on the board corresponding to the deletion starting point. On the other hand, the second storage unit 140 updates the recording image candidate to an image of writing on the board corresponding to a next deletion starting point, in the case where the deletion fixing point is not detected but the next deletion starting point is detected after detection of the deletion starting point. The types of deletion include temporary deletion due to correction and non-temporary deletion for resetting the writing target 2. Even in the case where the temporary deletion occurs, it is useless and inefficient to record an image of writing on the board obtained before the deletion of writing information starts, as a recording image. On the other hand, by detecting the deletion fixing point, it is possible to record an image of writing on the board obtained before the deletion starts, as a recording image only in the case where non-temporary deletion occurs. In addition, since the recording image candidate is an image of writing on the writing target 2 on which the largest amount of writing information is written, it is possible to record an image of writing on the board on which the largest amount of writing information is written, as a recording image. Images of writing on a board are efficiently recorded in the above-described way.

In addition, in the case where the deletion fixing point is detected after detection of the deletion starting point, the second storage unit 140 stores the image of writing on the board corresponding to the deletion ending point, as a comparison target image. Here, an image of writing on the board corresponding to the deletion ending point is to be stored as the comparison target image, and the image of writing on the board corresponding to the deletion ending point is a past image (in other words, the second image of writing on the board) used in the comparison process between images of writing on the board for calculating a deletion rate at the deletion ending point, for example. Accordingly, it is possible to use the image of writing on the board obtained after deletion of writing information ends, as the comparison target image. Typically, the image of writing on the board obtained after deletion of writing information ends shows the writing target 2 on which the smallest amount of writing information is written. Note that, the comparison target image is used for specifying a deletion area (to be described later).

The recording image is accumulated (in other words, additionally stored) each time non-temporary deletion occurs. On the other hand, the recording image candidate is updated (in other words, overwritten) each time a deletion starting point is detected. The comparison target image is updated (in other words, overwritten) each time non-temporary deletion occurs. The recording of images of writing on the board other than recording images is suppressed to the minimum in the above-described way. Therefore, it is possible to record the images of writing on the board efficiently.

(2) Case of Addition

Next, a case where change in writing information is addition of the writing information will be described. In this case, the change starting point, the change fixing point, the change ending point may also be referred to as an addition starting point, an addition fixing point, and an addition ending point, respectively.

In the case where the addition starting point is detected, the second storage unit 140 stores the image of writing on the board corresponding to the addition starting point, as a comparison target image. Here, an image of writing on the board corresponding to the addition starting point is to be stored as the comparison target image, and the image of writing on the board corresponding to the addition starting point is a past image (in other words, the second image of writing on the board) used in the comparison process between images of writing on the board for calculating an addition rate at the addition starting point. Accordingly, it is possible to certainly use the image of writing on the board obtained before the addition starts, as the comparison target image. Typically, the image of writing on the board obtained before addition of writing information starts shows a writing target 2 on which the smallest amount of writing information is written. Note that, the comparison target image is used for specifying an addition area (to be described later).

In the case where the addition fixing point is detected after detection of the addition starting point, the second storage unit 140 specifies and stores the image of writing on the board corresponding to the addition ending point, as a recording image. Here, an image of writing on the board corresponding to the addition ending point is to be stored as the recording image, and the image of writing on the board corresponding to the addition ending point is a past image (in other words, the second image of writing on the board) used in the comparison process between images of writing on the board for calculating an addition rate at the addition ending point, for example. Accordingly, it is possible to use the image of writing on the board obtained after addition of writing information ends, as the recording image. Typically, the image of writing on the board obtained after addition of writing information ends shows the writing target 2 on which the largest amount of writing information is written. The types of addition include temporary addition such as addition or the like of a small amount of writing information, and non-temporary addition for adding a large amount of writing information to the writing target 2. It is useless and inefficient to record an image of writing on the board as a recording image each time the temporary addition occurs. On the other hand, by detecting the addition fixing point, it is possible to record an image of writing on the board obtained after the addition ends, as a recording image only in the case where non-temporary addition occurs. In addition, since the image of writing on the board obtained after addition ends is an image of writing on the writing target 2 on which the largest amount of writing information is written, it is possible to record the image of writing on the board on which the largest amount of writing information is written, as a recording image. Images of writing on a board are efficiently recorded in the above-described way.

On the other hand, the second storage unit 140 updates the comparison target image to an image of writing on the board corresponding to a next addition starting point, in the case where the addition fixing point is not detected but the next addition starting point is detected after detection of the addition starting point.

The recording image is accumulated (in other words, additionally stored) each time non-temporary addition occurs. On the other hand, the comparison target image is updated (in other words, overwritten) each time an addition starting point is detected. The recording of images of writing on the board other than recording images is suppressed to the minimum in the above-described way. Therefore, it is possible to record the images of writing on the board efficiently.

3.4. Specification of Change Area

The output control unit 150 specifies an area (also referred to as a change area) in which the writing target 2 is changed between the change starting point and the change ending point. Specifically, the output control unit 150 takes a difference between an image of writing on the board corresponding to the change starting point and an image of writing on the board corresponding to the change ending point, and specifies an area including the difference as the change area. A plurality of recording images may be recorded because a meeting or a lecture goes forward while repeating addition and deletion of writing information. Accordingly, it can be said that the change area is an area changed from a last recording image, and is a notable area. By specifying the change area, it is possible to specify the notable area in the recording image.

In the case where change in writing information is deletion of the writing information, the image of writing on the board corresponding to the change starting point is a recording image, and the image of writing on the board corresponding to the change ending point is a comparison target image. In addition, on the writing target 2, an area in which writing information is deleted through a series of movements made by the writer 3 for deleting writing information, is specified as a change area. Such a change area may also be referred to as the deletion area.

In the case where change in writing information is addition of the writing information, the image of writing on the board corresponding to the change starting point is a comparison target image, and the image of writing on the board corresponding to the change ending point is a recording image. In addition, on the writing target 2, an area in which writing information is added through a series of movements made by the writer 3 for adding writing information, is specified as a change area. Such a change area may also be referred to as the addition area.

Details of a method for specifying the change area will be described. First, the output control unit 106 extracts changed pixels in a way similar to the comparison process described with reference to FIG. 3. In other words, the output control unit 150 performs a binarization process on each of the image of writing on the board corresponding to the change starting point and the image of writing on the board corresponding to the change ending point, takes a difference between them, acquires a difference image, and removes noise from the difference image. Accordingly, the output control unit 150 acquires the difference image generated by extracting the changed pixels. Next, the output control unit 150 specifies the change area on the basis of the difference image. The change area may be the same as the changed pixels or may be different from the changed pixels. For example, the change area may be an area that has any shape including the changed pixels. Details thereof will be described with reference to FIG. 8.

FIG. 8 is a diagram illustrating an example of specifying a change area according to the present embodiment. As illustrated in FIG. 8, a difference image 30 generated by extracting changed pixels 32 is obtained through the comparison process between the image of writing on the board corresponding to the change starting point and the image of writing on the board corresponding to the change ending point. In this case, the output control unit 150 may specify the minimum rectangle 34 including the changed pixels 32, as the change area. Alternatively, the output control unit 150 may specify a rectangle 36 as the change area. The rectangle 36 is obtained by enlarging the minimum rectangle 34 including the changed pixels 32 by a predetermined offset. Alternatively, the output control unit 150 may specify the changed pixels 32 and ambient pixels within a predetermined distance from the changed pixels 32, as the change area.

The second storage unit 140 stores the recording image and information indicating the change area (corresponding to change area information) in association with each other. In other words, the output control unit 150 causes the second storage unit 140 to store the recording image and the information indicating the change area in association with each other. Accordingly, it becomes possible to record recording images in association with information indicating respective notable areas.

3.5. Output of Recording Image

The output control unit 150 outputs the recording image. At this time, the output control unit 150 may generate and output an image in which the information indicating the change area is overlapped on the recording image. An example thereof will be described with reference to FIG. 9 to FIG. 11.

FIG. 9 is a diagram illustrating an output example of a recording image according to the present embodiment. FIG. 9 shows an example in the case where change in writing information is deletion of the writing information. It is assumed that an image (in other words, recording image) 40 of writing on a board corresponding to a deletion starting point and an image (in other words, comparison target image) 43 of writing on the board corresponding to a deletion ending point are obtained. The image 40 of writing on the board includes writing information 41, an area 42 including a writer 3. The image 43 of writing on the board includes writing information 44, an area 45 including the writer 3. The output control unit 150 compares the image 40 of writing on the board with the image 43 of writing on the board, and specifies a rectangle as a deletion area. The rectangle is obtained by enlarging the minimum rectangle including a lower sentence of the writing information 41 by a predetermined offset. Subsequently, the output control unit 150 overlaps a specified rectangle 46 of the deletion area on the image 40 of writing on the board, and outputs the image 40 as illustrated in FIG. 9.

FIG. 10 is a diagram illustrating an output example of a recording image according to the present embodiment. FIG. 10 shows another output example of a recording image in the case where the image (in other words, recording image) 40 of writing on the board corresponding to the deletion starting point and the image (in other words, comparison target image) 43 of writing on the board corresponding to the deletion ending point are obtained as illustrated in FIG. 9. As illustrated in FIG. 10, the output control unit 150 may overlap a translucent black image 47 on an area other than the specified deletion area in the image (in other words, recording image) 40 of writing on the board, and output the overlapped image 40. In this case, the specified deletion area in the image 40 of writing on the board is highlighted in white and emphasized.

FIG. 11 is a diagram illustrating an output example of a recording image according to the present embodiment. FIG. 11 shows another output example of a recording image in the case where the image (in other words, recording image) 40 of writing on the board corresponding to the deletion starting point and the image (in other words, comparison target image) 43 of writing on the board corresponding to the deletion ending point are obtained as illustrated in FIG. 9. However, in this example, changed pixels and ambient pixels within a predetermined distance from the changed pixels are assumed to be specified as a deletion area. As illustrated in FIG. 11, the output control unit 150 may overlap a translucent black image 48 on an area other than the specified deletion area (the changed pixels and ambient pixels within a predetermined distance from the changed pixels) in the image (in other words, recording image) 40 of writing on the board, and output the overlapped image 40. In the example illustrated in FIG. 11, lightness of the black image 48 varies such that pixels closer to the changed pixels are lighter and pixels father from the changed pixels are darker. In this example, the specified deletion area in the image 40 of writing on the board is also highlighted in white and emphasized in a way similar to the example illustrated in FIG. 10.

Note that, the example of the output image obtained in the case where change in writing information is deletion of the writing information has been described above. Even in the case where the change in writing information is addition of the writing information, an output image is also generated in a similar way.

The output control unit 150 may output the recording image as a still image, or the output control unit 150 may output a processed recording image. For example, the output control unit 150 may generate and output a moving image on the basis of a recording image, or may generate and output a document file on the basis of the recording image.

In the case where the recording image is output as a still image, the output control unit 150 outputs the latest recording image each time the second storage unit 140 stores a new recording image, for example.

In the case where the recording image is output as a moving image, the output control unit 150 streams the latest recording image each time the second storage unit 140 stores a new recording image, for example. The second storage unit 140 may store the generated moving image. The output control unit 150 may output the moving image in real time. An example thereof will be described with reference to FIG. 12. FIG. 12 is a diagram illustrating an output example of a recording image according to the present embodiment. FIG. 12 illustrates a situation in which a lecture is held in a lecture room. The input apparatus 200 is installed on the ceiling in the lecture room, and a moving image of the lecture is captured in real time. In addition, output apparatuses 300A to 300C stream the latest recording image each time the information processing apparatus 100 (not illustrated) stores a new recording image. The output apparatuses 300A and 300B are displays installed such that they are hung from the ceiling in the lecture room. The output apparatus 300C is a tablet terminal held by a listener. The output apparatuses 300A to 300C output the image 40 of writing on the board overlapped with the rectangle 46 of the deletion area described with reference to FIG. 9. In this case, the listener is capable of seeing writing information that has already been deleted in real time, and avoiding disadvantage occurred when the listener misses an opportunity to take a note, or the like.

In the case where the recording image is output as a document file, the output control unit 150 attaches the latest image while going to a further page each time the second storage unit 140 stores a new recording image, and then outputs a single file including the plurality of pages when the recording ends, for example. The second storage unit 140 may store the generated document file. The document file is capable of collecting necessary and sufficient writing information, and this makes it easier to look back on the lecture, meeting, or the like.

3.6. Workflow of Process

FIG. 13 is a flowchart illustrating an example of a workflow of a recording process of an image of writing on a board performed by the information processing apparatus 100 according to the present embodiment. The workflow shows an example of a workflow of a process performed in the case where change in writing information is deletion of the writing information.

As illustrated in FIG. 13, the first storage unit 120 first buffers images of writing on a board acquired by the acquisition unit 110 (Step S102). Next, the detection unit 130 performs a comparison process between the images of writing on the board, and calculates a deletion rate in the images of writing on the board on the basis of an acquired difference image (Step S104). These steps are assumed to be constantly performed (for example, in intervals between respective subsequent steps).

Next, the detection unit 130 detects a deletion starting point on the basis of chronological change in the deletion rate (Step S106). After detecting the deletion starting point, the second storage unit 140 stores an image of writing on the board corresponding to the deletion starting point, as a recording image candidate (Step S108).

Next, the detection unit 130 detects a deletion fixing point on the basis of chronological change in the deletion rate (Step S110). After detecting the deletion fixing point, the second storage unit 140 stores the recording image candidate as a recording image (Step S112).

Next, the detection unit 130 detects a deletion ending point on the basis of chronological change in the deletion rate (Step S114). After detecting the deletion ending point, the output control unit 150 specifies a deletion area corresponding to the recording image, and the second storage unit 140 stores the deletion area in association with the recording image (Step S116). Subsequently, the output control unit 150 outputs the recording image stored by the second storage unit 140 to the output apparatus 300, and causes the output apparatus 300 to output the recording image (Step S118).

3.7. Modifications (1) Another Method of Detecting Change Starting Point

The detection unit 130 may detect a change starting point on the basis of a motion of holding stationery, the motion being made by the writer 3 who writes writing information on the writing target 2. For example, as a deletion starting point, the detection unit 130 may detect a timing at which the writer 3 holds stationery (such as an eraser) in his/her hand. The stationery is for deleting writing information. In addition, as an addition starting point, the detection unit 130 may detect a timing at which the writer 3 holds stationery (such as a piece of chalk) in his/her hand. The stationery is for writing writing information. This enables detection of a change starting point that is earlier than a change starting point detected through the comparison process between images of writing on a board. As a result, it becomes possible to record an image of writing on a board obtained before deletion or addition starts, more certainly.

Note that, it may be possible to combine the method of detecting a change starting point on the basis of a change rate and the method of detecting a change starting point on the basis of a motion of holding stationery. For example, a timing at which a motion of holding stationery is detected and chronological change in a change rate has a positive gradient, may be detected as the change starting point.

(2) Another Method of Detecting Change Ending Point

The detection unit 130 may detect a change ending point on the basis of a motion of letting go of stationery, the motion being made by the writer 3 who writes writing information on the writing target 2. For example, as a deletion ending point, the detection unit 130 may detect a timing at which the writer 3 lets go of stationery for deleting writing information. In addition, as an addition ending point, the detection unit 130 may detect a timing at which the writer 3 lets go of stationery for writing writing information. This enables detecting a timing at which deletion/addition of a series of pieces of writing information performed by the writer 3 ends, as a change ending point. Accordingly, it may become possible to improve efficiency of recording of images of writing on a board.

Note that, it may be possible to combine the method of detecting a change ending point on the basis of a change rate and the method of detecting a change starting point on the basis of a motion of letting go of stationery. For example, a timing at which a motion of letting go of stationery is detected and a change rate becomes a second threshold or less, may be detected as the change ending point.

(3) Access from Terminal Apparatus

The example in which the information processing apparatus 100 outputs recording images in the form of still images, a moving image, or a document file, has been described above. However, the present technology is not limited thereto. For example, the information processing apparatus 100 may store the recording images in the form of still images, a moving image, or a document file, and allow access from a terminal apparatus such as a PC, a smartphone, or a tablet terminal. In this case, the information processing apparatus 100 transmits the recording images in the form of still images, a moving image, or a document file, to the terminal apparatus that have accessed the information processing apparatus 100.

(4) Extraction of Recording Image Based on Past Data

The example in which the information processing apparatus 100 extracts and records recording images by performing a real-time process on images input by the input apparatus 200, has been described above. However, the present technology is not limited thereto. For example, the information processing apparatus 100 may extract and record recording images on the basis of images that have been input by the input apparatus 200 and recorded in the past.

4. HARDWARE CONFIGURATION EXAMPLE

Last of all, with reference to FIG. 14, a hardware configuration of the information processing apparatus according to the present embodiment will be described. FIG. 14 is a block diagram illustrating an example of a hardware configuration of an information processing apparatus according to the present embodiment. Note that, for example, the information processing apparatus 900 illustrated in FIG. 14 may implement the information processing apparatus 100 illustrated in FIG. 2. The information process performed by the information processing apparatus 100 according to the present embodiment is achieved by operating cooperatively software and hardware (to be described later).

As illustrated in FIG. 14, the information processing apparatus 900 includes a central processing unit (CPU) 901, read only memory (ROM) 902, random access memory (RAM) 903, and a host bus 904a. In addition, the information processing apparatus 900 includes a bridge 904, an external bus 904b, an interface 905, an input apparatus 906, an output apparatus 907, a storage apparatus 908, a drive 909, a connection port 911, and a communication apparatus 913. The information processing apparatus 900 may include a processing circuit such as an electric circuit, a DSP, or an ASIC instead of or in addition to the CPU 901.

The CPU 901 functions as an arithmetic processing apparatus and a control apparatus to control entire operation in the information processing apparatus 900 in accordance with various kinds of programs. In addition, the CPU 901 may be a microprocessor. The ROM 902 stores programs, operation parameters, and the like used by the CPU 901. The RAM 903 transiently stores programs used when the CPU 901 is executed, and parameters and the like that change as appropriate when the CPU 901 is executed. The CPU 901 may implement, for example, the acquisition unit 110, the detection unit 130, and the output control unit 150 illustrated in FIG. 2. In addition, the CPU 901 may realize the function of the recording control unit among the functions of the second storage unit 140 illustrated in FIG. 2.

The CPU 901, the ROM 902, and the RAM 903 are connected to each other through the host bus 904a including a CPU bus and the like. The host bus 904a is connected to the external bus 904b such as a peripheral component interconnect/interface (PCI) bus via the bridge 904. Note that, the host bus 904a, the bridge 904, and the external bus 904b are not necessarily configured as separate components, but their functions may be incorporated into in a single bus.

The input apparatus 906 may include apparatuses configured to detect various kind of information. For example, the input apparatus 906 may include various kinds of sensors such as an image sensor (camera, for example), a depth sensor (stereo camera, for example), an acceleration sensor, a gyro sensor, a geomagnetic sensor, an optical sensor, a sound sensor, a ranging sensor, and a force sensor. In addition, the input apparatus 906 may acquire information related to the state of the information processing apparatus 900 itself such as the posture and moving speed of the information processing apparatus 900, and acquire information related to a surrounding environment of the information processing apparatus 900 such as surrounding brightness and noise of the information processing apparatus 900. In addition, the input apparatus 906 may include a global navigation satellite system (GNSS) module that receives a GNSS signal from a GNSS satellite (such as a global positioning system (GPS) signal from a GPS satellite) to measure position information including latitude, longitude, and altitude of an apparatus. In addition, with regard to the position information, the input apparatus 906 may detect a position through Wi-Fi (registered trademark), transmission/reception to/from a mobile phone, a PHS phone, a smartphone, or the like, near-field communication, or the like. The input apparatus 906 may implement, for example, the input apparatus 200 illustrated in FIG. 2. In other words, the information processing apparatus 100 may have the functions of the input apparatus 200.

The output apparatus 907 is implemented by an apparatus capable of issuing visual or auditory notification of the acquired information to the user. Examples of such apparatus include a display apparatus such as a CRT display apparatus, a liquid crystal display apparatus, a plasma display apparatus, an EL display apparatus, a laser projector, an LED projector, or a lamp, a sound output apparatus such as a speaker or headphones, and a printer apparatus. The output apparatus 907 outputs, for example, results acquired through various processes performed by the information processing apparatus 900. Specifically, the display apparatus visually displays results acquired through various processes performed by the information processing apparatus 900 in various formats such as text, images, tables, and graphs. On the other hand, the sound output apparatus converts audio signals including reproduced sound data, audio data, and the like into analog signals and audibly outputs the analog signals. The output apparatus 907 may implement, for example, the output apparatus 300 illustrated in FIG. 2. In other words, the information processing apparatus 100 may have the functions of the output apparatus 300.

The storage apparatus 908 is an apparatus for data storage configured as an example of the storage units of the information processing apparatus 900. For example, the storage apparatus 908 is implemented by a magnetic storage device such as an HDD, a semiconductor storage device, an optical storage device, a magneto-optical storage device, or the like. The storage apparatus 908 may include a storage medium, a recording apparatus for recording data on the storage medium, a reader apparatus for reading out data from the storage medium, a deletion apparatus for deleting data recorded on the storage medium, and the like. The storage apparatus 908 stores programs and various types of data to be executed by the CPU 901, various types of data acquired from the outside, and the like. The storage apparatus 908 may implement, for example, the first storage unit 120 and the second storage unit 140 illustrated in FIG. 2.

The drive 909 is a reader/writer for the storage medium, and is incorporated in or externally attached to the information processing apparatus 900. The drive 909 reads information recorded on a removable storage medium that is mounted such as a magnetic disk, an optical disc, a magneto-optical disk, or semiconductor memory, and outputs the information to the RAM 903. In addition, the drive 909 also writes information to the removable storage medium.

The connection port 911 is an interface for connection to external equipment. For example, the connection port 911 is a connection port for connection to external equipment that can transmit data via Universal Serial Bus (USB). According to the present embodiment, the input apparatus 200 is connected to the connection port 911, for example, and images of writing on a board input by the input apparatus 200 is output to the information processing apparatus 900. According to the present embodiment, the output apparatus 300 is connected to the connection port 911, for example, and recording images recorded by the information processing apparatus 900 is output to the output apparatus 300.

The communication apparatus 913 is, for example, a communication interface implemented by communication equipment or the like for connection with a network 920. The communication apparatus 913 is, for example, a communication card or the like for a wired or wireless local area network (LAN), long term evolution (LTE), Bluetooth (registered trademark), or wireless USB (WUSB). In addition, the communication apparatus 913 may be a router for optical communication, a router for asymmetric digital subscriber line (ADSL), a modem for various kinds communication, or the like. For example, the communication apparatus 913 is capable of transmitting and receiving signals and the like to and from the Internet or other communication equipment, for example, in accordance with a predetermined protocol such as TCP/IP or the like. According to the present embodiment, for example, the communication apparatus 913 may receive images of writing on a board from the input apparatus 200 and transmit recording images to the output apparatus 300.

Note that, the network 920 is a wired or wireless transmission path through which information is transmitted from apparatuses connected to the network 920. For example, the network 900 may include a public network such as the Internet, a telephone network, and a satellite communication network, various LANs including Ethernet (registered trademark), a wide area network (WAN), and the like. In addition, the network 920 may include a dedicated network such as an internet protocol-virtual private network (IP-VPN).

The example of the hardware configuration capable of implementing the functions of the information processing apparatus 900 according to the present embodiment has been described above. The respective structural elements described above may be implemented using universal members, or may be implemented by hardware that is specific to the functions of the respective structural elements. Accordingly, it is possible to change a hardware configuration to be used appropriately depending on the technical level at each time of carrying out the embodiments.

Note that, it is possible to create a computer program for implementing each of the functions of the information processing apparatus 900 according to the present embodiment, and mount them in a PC or the like. Furthermore, a computer-readable recording medium on which such computer programs are stored may be provided. The recording medium is, for example, a magnetic disc, an optical disc, a magneto-optical disc, a flash memory, or the like. Alternatively, the computer program may be distributed, for example, via a network without using the recording medium.

5. CONCLUSION

With reference to FIG. 1 to FIG. 14, the embodiment of the present disclosure has been described above. As described above, the information processing apparatus 100 according to the present embodiment detects change in writing information written on a writing target, and specifies an image of writing on a board on the basis of the detected change, the image showing the writing target including the writing information. The information processing apparatus 100 is capable of specifying an image of writing on a board to be recorded on the basis of change in writing information, specifying an image of writing on a board obtained at a timing at which the largest amount of writing information has been written on the writing target, and recording it. In addition, the information processing apparatus 100 does not successively record a series of images of writing on a board that have been sequentially input as it is, but the information processing apparatus 100 selectively records some of the images of writing on the board. This enables effective recording of writing information written on a writing target. Specifically, it is possible to reduce storage capacity used for storing images of writing on a board. In addition, it is also possible to reduce transmission quantity used for transmitting images of writing on a board.

The information processing apparatus 100 according to the present embodiment calculates the amount of change by comparing an image of writing on a board obtained at the current time with an image of past writing on the board, and detects a change starting point, a change fixing point, and a change ending point on the basis of the amount of change, respectively. Subsequently, the information processing apparatus 100 records an image of writing on a board only in the case where occurrence of the change is fixed. This enables preventing useless recording. In addition, the information processing apparatus 100 records an image of writing on the board obtained before deletion starts or after addition ends. This enables preventing an image of writing on the board from being recorded with lacked information.

It should be understood by those skilled in the art that various modifications, combinations, sub-combinations and alterations may occur depending on design requirements and other factors insofar as they are within the scope of the appended claims or the equivalents thereof.

For example, the example in which the information processing apparatus 100 stores recording images has been described in the above-described embodiment. However, the present technology is not limited thereto. Images of writing on a board that has been specified as images to be recorded by the information processing apparatus 100 may be output from the information processing apparatus 100 and may be recorded by an external storage medium.

Note that, the apparatuses described in the present specification may be implemented as a single apparatus. Alternatively, some or all of the apparatuses may be implemented as separate apparatuses. For example, in the functional configuration example of the information processing apparatus 100 illustrated in FIG. 2, the second storage unit 140 and the output control unit 150 may be installed in an apparatus such as a server connected to the acquisition unit 110, the first storage unit 120, and the detection unit 130 via a network or the like.

In addition, it may not be necessary to execute the process described using the sequence diagrams or the flow chart in the present specification, in the illustrated order. Some of the process steps may be executed in parallel. In addition, an additional process step may be added, and some process steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

In a summary embodiment of the present invention, an image archiving method for use with a writing target 2 comprises, in a first step, receiving a series of captured images of the writing target, for example as described previously herein in relation to section 3.1, 'Buffering of images of writing on a board'. It will be appreciated that the writing target or writing surface may be any suitable visible surface upon which content may change. Examples include any re-writable physical surface such as a chalkboard or whiteboard, or an interactive whiteboard, or TV screen or projected image.

In a second step, the method comprises detecting difference between first and second candidate images separated by a predetermined period of time, where additive differences are indicative of writing and subtractive differences are indicative of erasure, for example as discussed previously herein in relation to section 3.2 'Detection of change in writing information'. As was explained therein, more images may be captured than are compared for differences, for example when periodically extracting candidate images from a video sequence. Hence in an instance of this summary embodiment, the predetermined period of time between first and second candidate images is longer than the image capture period.

Upon detecting a subtractive difference (for example, the change starting point referred to previously herein), the method comprises a third step of temporarily retaining the last candidate image captured prior to the detection, for example as discussed previously herein in relation to section 3.2 'Detection of change in writing information', and section 3.3. 'Recording of image of writing on board'.

Subsequently the method also comprises a fourth step of detecting whether the subtractive difference (subtraction) relative to the retained last image exceeds a subtraction threshold amount (for example, the change fixing point referred to previously herein); and if so, then storing the retained image (e.g. the last candidate image as retained, or optionally as processed for example to graphically highlight changes, or to implement any presentational or processing techniques described herein), for example using the second storage unit 140, again as discussed previously herein in relation to section 3.2 'Detection of change in writing information', and section 3.3. 'Recording of image of writing on board'.

In a parallel summary embodiment, upon detecting an additive difference, the method may comprise the steps of detecting whether an additive difference between candidate received images exceeds a first addition threshold amount, and if so, then detecting whether an additive difference between candidate received images then falls below a second addition threshold amount; and if so in turn, then storing the candidate received image corresponding to when the additive difference between candidate received images falls below the second addition threshold amount. It will be appreciated that, as described previously herein, the present invention may use a similar approach for recording images according to sufficient additive or subtractive change, for example dependent upon the change fixing threshold, also referred to as the addition fixing threshold or the deletion fixing threshold herein.

In an instance of these summary embodiments, the method may comprise the step of estimating a change rate as an amount of difference between the first and second images within the predetermined period of time, as described for example in section 3.2 part (1), 'Calculation of amount of change'.

In this instance, optionally the change rate is smoothed on the basis of two or more successive estimations, for example as recited in [Math. 2] and the associated text of section 3.2 part (1), 'Calculation of amount of change'.

In an instance of these summary embodiments, the method may comprise the step of selecting a candidate image captured prior to the change rate exceeding a noise-floor threshold as a first image to use in the step of detecting differences between images, for example as described in relation to the recording image candidate in section 3.3 part (1), 'Case of deletion' or for example as described in relation to the comparison target image in section 3.3 part (2), 'Case of addition'.

In an instance of these summary embodiments, optionally upon detecting subtractive difference, the step of storing a retained image is conditional on the change rate previously exceeding one or more selected from the list consisting of a noise-floor threshold, a predetermined gradient of the change rate, and an erasure threshold corresponding to a predetermined amount of erasure, as described for example in section 3.2 part (2) 'Detection of change starting point' and section 3.3 part (1) 'Case of deletion'. The change starting point may be based upon the change rate previously exceeding a noise floor threshold, or optionally also in conjunction with reaching or exceeding a predetermined gradient of the change rate. Meanwhile the erasure threshold corresponding to a predetermined amount of erasure may correspond to the change fixing point in the context of being a deletion fixing point at the first threshold.

Optionally, in an instance of these summary embodiments detection of a starting point for a subtractive difference by erasure may comprise detecting motion of an item of stationery associated with an act of deletion (such as an eraser being moved from its current rest position, or being moved across the writing surface), as described for example in section 3.7 'Modification'. Such detection may be used alone to detect the start point, or may be used in conjunction with the change detection described elsewhere herein, for example to cross-validate and disambiguate detections. The item of stationery may have a distinctive marking or color to assist with its own detection.

Similarly, in an instance of these summary embodiments optionally upon detecting additive difference, the step of storing a candidate received image is conditional on the change rate previously exceeding one or more selected from the list consisting of a noise-floor threshold, a predetermined gradient of the change rate, and a writing threshold corresponding to a predetermined amount of writing, as described for example in section 3.2 part (2) 'Detection of change starting point' and section 3.3 part (2) 'Case of addition'. The change starting point may be based upon the change rate previously exceeding a noise floor threshold, or optionally also in conjunction with reaching or exceeding a predetermined gradient of the change rate. Meanwhile the writing threshold corresponding to a predetermined amount of writing may correspond to the change fixing point in the context of being an addition fixing point at the first threshold.

Similarly optionally, in an instance of these summary embodiments detection of a starting point for an additive difference by writing may comprise detecting motion of an item of stationery associated with an act of writing (such as a pen or chalk being moved from its current rest position, or being moved across the writing surface), as described for example in section 3.7 'Modification'. Such detection may be used alone to detect the start point, or may be used in conjunction with the change detection described elsewhere herein, for example to cross-validate and disambiguate detections. The item of stationery may have a distinctive marking or color to assist with its own detection.

In an instance of these summary embodiments, where the method comprises estimating a change rate as an amount of difference between the first and second images within the predetermined period of time, optionally storing a retained image is made conditional on the change rate subsequently falling below an ending threshold level, for example as described in relation to the change ending point (as either an addition ending point or subtraction ending point at the second threshold).

In an instance of these summary embodiments, the method may comprise the steps of identifying one or more areas in which a difference in the images is detected for the retained image, and if the retained image is stored, then also storing information identifying the or each area as a notable area in association with the stored image, for example as described in relation to the change area in section 3.4 'Specification of change area'.

In an instance of these summary embodiments, the method may comprise the steps of identifying any region within the first and second candidate images that intersects with an edge of the writing target, and discounting any such region in either candidate image when detecting differences in the images. Referring to FIGS. 1 and 9 to 12, it will be appreciated that the input apparatus 200 (such as a video camera, web cam or the like) may be positioned such that the person 3 writing on the writing target, or presenting in front of it, becomes a silhouette (42, 45) within a processed version of candidate images used to detect differences in content. However, it will be appreciated that this person is not part of the intended content themselves. Whilst in principle it is possible to detect writing or other arbitrary drawings or markings made or presented by this person for the purposes of determining what content has been changed, a more computationally efficient approach is to discount or disregard areas (e.g. contiguous blocks) that intersect with at least one outer boundary of the writing target in either candidate image being used to detect differences. This is because the person will either be standing in front of the target and hence extend below the lower boundary, or will be reaching across it and hence extend into the left or right boundary. In the specific example of the binary images of FIG. 3 for example, one could discount any contiguous block of white pixels starting from a boundary of the writing target, and perform an AND operation on such pixels from each email to obtain a combined area that is unsuitable for comparison in this pair of images. Conversely, it can be reasonably assumed that the whole of the writing target will be visible at various points and hence in various candidate images during the course of the generation or presentation of content by the person, and so comparisons of the currently visible parts of the image may be made over time to provide good coverage of all the content.

Optionally in this instance of these summary embodiments, further techniques may be employed. For example, storing of a retained image may be made conditional on more than a threshold percentage of the writing target being currently visible in the retained image (for example, because the person has stepped away from the writing target, which is a common activity once a block of writing is complete). Similarly, optionally an additional discounted boundary may be placed around the region of the user to account for shadows and/or aliasing effects giving false positive changes. Similarly optionally, where the contrast between the person and the writing target is much lower than the contrast between the writing and the background of the writing target, such that any image processing (such as the binary image process described herein) has brightness or contrast thresholds that break up the appearance of the person (so that for example, if they are wearing a dark jumper against a chalk board, only their hand is identified as a possible marking), then such regions can be discounted on the basis of their comparative size or thickness compared to writing or other lines, and/or on the basis of their temporary nature; such a region will change between images due to movement, whereas most text will remain static over multiple images; furthermore, most changes will be adjacent to other text and will also be subsequently static. As a result, by using comparisons over more than two images (for example over three, four, five or more images), it is possible to distinguish partially captured elements of the person on the basis of their changing nature compared to either addition or deletion of writing, which remains subsequently consistent. Such an approach may also be used to discount or disregard a mouse icon, laser pointer or other transitory feature visible on the writing target. In the case of a mouse icon, optionally where such icon is known its shape may be recognized and discounted.

Hence also in an instance of these summary embodiments, the method may comprise the steps of combining two or more candidate images of the writing target from which a respective region has been discounted, to form a substantially complete image of the writing target for use as one or more selected from the list consisting of first or second candidate received image, retaining candidate image; and stored image.

In an instance of these summary embodiments, the method may comprise the steps of storing a video sequence of the writing target, from which the candidate received images were obtained, and associating with the stored video sequence timestamps corresponding to the timings within the video sequence at which candidate received images were stored (e.g. the change end point).

Optionally, where the candidate image is derived from an image in the video recording, another identification timestamp of frame count may be used to identify the equivalent of the stored image. In this way, it is possible to identify those image frames (or separately captured and potentially higher resolution still images with corresponding timestamps) that were eventually stored in accordance with the techniques herein either because they represented significant additive changes or preceded significant subtractive changes. In principle, the stored images themselves may also be stored in association with the video sequence, but where the stored images were obtained or derived from the video sequence itself, then this is potentially redundant.

In this instance, the method may then comprise associating with the stored video sequence timestamps respectively corresponding to a change start point preceding the storage of a candidate received image.

Complementing this, in a summary embodiment of the present invention an image processing method for use with a video recording of a writing target comprises the steps of obtaining a video sequence of the writing target (for example recorded as described previously herein); obtaining one or more first timestamps corresponding to timings within the video sequence at which candidate received images were stored according to the method of any preceding claim (for example stored in association with the video, as described previously herein); obtaining one or more second respective timestamps for the candidate received images that were stored respectively corresponding to a change start point preceding the storage of a candidate received image (for example also stored in association with the video, as described previously herein); playing back the video sequence (for example by streaming upon demand, or during a pre-recorded webinar, broadcast or the like, or live); and at a time in the video sequence corresponding to the second respective timestamp, overlaying on the video the corresponding respective candidate received image that was stored.

Hence in the case of additive changes, the completed block of new writing will be displayed before it is written by the author within the underlying video, thus increasing the time during which it is visible to the viewer. Meanwhile in the case of subtractive changes, the existing writing will remain in overlay even as it is erased by the author within the underlying video, again increasing the time during which it is visible to the viewer.

In this instance, optionally this overlay may then continue to be displayed until a time in the video sequence corresponding to or later than the first respective timestamp, the first timestamp corresponding the time at which the image was stored and in turn corresponding to the change end point. For additive changes, the image therefore segues into the current representation of the completed block of new writing. Meanwhile for subtractive changes the image may revert to the state of the writing target after erasure is complete. Optionally therefore the overlay may persist for example until the next second timestamp, corresponding to the start of the next significant additive change.

In other words, for a given stored image (either stored in association with the video recording, or identified within the video recording by an identifier), together with a first timestamp, then a second time stamp is also associated with the video recording that serves to indicate when that stored image should be displayed, for example as an overlay on top of the video image, optionally processed for example so as to be transparent or partially transparent in regions other than where writing is found.

Hence by displaying a stored image during video playback, starting at the second time stamp, the state of the writing target at the end of a substantial change (typically an additive change) will be displayed at the point within the video sequence corresponding to the start of that substantial change. This provides viewers with the maximum time to read the material, whilst also benefiting from the writer's commentary within the video as they proceed to write and hence catch up with the content found in the overlaid stored image.

The above techniques and methods, with reference for example to FIGS. 6 and 7, imply the gradual addition of writing material and the gradual deletion of said material over the course of several moments corresponding for example to a change start point, a change fixing point, and a change ending point. However it will be appreciated that in principle the invention also works in the case of an instantaneous change such as that associated with a PowerPoint (Registered Trademark) slide or interactive whiteboard, where the start point and change fixing point about satisfied by an effectively instantaneous change of content, and the subsequent pause between slight satisfies the change ending point. Hence the techniques of the present invention are applicable to presentations combining a mix of media such as physical and digital writing, slide presentations, and a mixture of the two.

It will be appreciated that the above techniques and methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in another summary embodiment of the present invention, an information processing apparatus 100, 900 may be adapted to selectively archive images of a writing target 2. As described previously herein, such an information processing apparatus comprises an input (such as acquisition unit 200) operable to receive a series of captured images of the writing target, for example from the input apparatus 200. The apparatus also comprises a difference detection processor (e.g. a detection unit 130, 901), adapted (for example by suitable software instruction) to detect differences between first and second candidate received images separated by a predetermined period of time, where additive differences are indicative of writing and subtractive differences are indicative of erasure.

Upon detecting a subtractive difference, the difference detection processor is adapted (again for example by suitable software instruction) to temporarily retain the last candidate image captured prior to the detection (for example in first storage unit 120, in turn for example implemented using storage apparatus 908), detect whether the subtractive difference relative to the retained last image exceeds a subtraction threshold amount (for example at the second threshold corresponding to the change fixing point), and if so, then the difference detection processor is adapted (again for example by suitable software instruction) to store the retained last image in a storage unit (for example the second storage unit 140, in turn for example implemented using storage apparatus 908).

As with the method described previously, meanwhile in a parallel summary embodiment, upon detecting an additive difference, the difference detection processor may be adapted (again for example by suitable software instruction) to detect whether an additive difference between candidate received images exceeds a first addition threshold amount, (for example at the second threshold corresponding to the change fixing point), and if so, then the difference detection processor may be adapted (again for example by suitable software instruction) to detect whether an additive difference between candidate received images then falls below a second addition threshold amount (for example at the threshold corresponding to the change ending point) and if so, then the difference detection processor is adapted to store, in a storage unit (140, 908), for example the second storage unit 140, in turn for example implemented using storage apparatus 908, the candidate received image corresponding to when the additive difference between candidate received images falls below the second addition threshold amount.

Similarly in an instance of these summary embodiments, the difference detection processor may be adapted (again for example by suitable software instruction) to identify any region (42, 45) within the first and second candidate images that intersects with an edge of the writing target (2), and the difference detection processor may then be adapted (again for example by suitable software instruction) to discount any such region in either candidate image when detecting differences in the images.

It will be appreciated that the detection processor may be part of a device such as a PC operably coupled to the input device (for example in the same room as the writing target), or might be in a remote server on the same premises or provided elsewhere. Similarly, respective roles of the detection processor may be distributed between one or more processors local or remote to the writing target and hence one or more of the detection and storage functions of the difference detection processor may be implemented by a remote server; for example detection of a difference may be locally implemented, to select retained candidate images; these images are then sent by a suitable network to a remote server to implement the remaining relevant processing steps described herein. The results may then be kept at the server to assist distribution to potential viewers of the material, and/or returned to the local device.

In any case the local, remote or combined information processing apparatus may operate in conjunction with the image capture device (e.g. a still or video camera) to operate as a writing monitoring system, optionally also comprising a writing target for example of predetermined size and/or dimensions, and/or comprising predetermined features such as fiduciary markers in diagonally opposing corners, and/or high-contrast borders, etc., (for example to assist with identifying the writing target for the purposes of detecting differences in writing, the presence of the writer, and the like), and/or optionally comprising a video distribution system operable to distribute live and/or recorded video images of the writing target, together with overlays of stored images at appropriate times as described elsewhere herein, and/or optionally comprising one or more screens (e.g. TV screens, PC, laptop, tablet or phone screens) for displaying the distributed video to one or more users.

Finally, it will be apparent to a person skilled in the art that variations in the above apparatus corresponding to implementation of the various embodiments of the method as described and claimed herein are considered within the scope of the present invention, including but not limited to:

- the processor estimating a change rate as an amount of difference between the first and second images within the predetermined period of time;
  - in this case, the change rate being optionally smoothed on the basis of two or more successive estimations;
- selecting a candidate image captured prior to the change rate exceeding a noise-floor threshold as a first image to use in the step of detecting differences between images;
- the processor storing a retained image conditional on the change rate previously exceeding one or more selected from the list consisting of a noise-floor threshold, a predetermined gradient of the change rate, and an erasure threshold corresponding to a predetermined amount of erasure; the processor detecting a starting point for a subtractive difference by erasure by detecting motion of an item of stationery associated with an act of deletion
- the processor storing a retained image conditional on the change rate previously exceeding one or more selected from the list consisting of a noise-floor threshold, a predetermined gradient of the change rate, and a writing threshold corresponding to a predetermined amount of writing;
- the processor detecting a starting point for an additive difference by writing by detecting motion of an item of stationery associated with an act of writing
- the processor storing a retained image conditional on the change rate subsequently falling below an ending threshold level;
- the processor identifying one or more areas in which a difference in the images is detected for the retained image, and if the retained image is stored, then storing information identifying the or each area as a notable area in association with the stored image;
- the processor identifying any region (42,45) within the first and second candidate images that intersects with an edge of the writing target (2), and discounting (disregarding) any such region in either candidate image when detecting differences in the images;
- the processor combining two or more candidate images of the writing target from which a respective region has been discounted, to form a substantially complete image of the writing target for use as one or more selected from the list consisting of a first or second candidate received image, a retained candidate image, and a stored image;
- the processor storing a video sequence of the writing target, from which the candidate received images were obtained, and associating with the stored video sequence timestamps corresponding to the timings within the video sequence at which candidate received images were stored; and
  - in this case, the processor associating with the stored video sequence timestamps respectively corresponding to a change start point preceding the storage of a candidate received image.

In a similar manner, corresponding to methods described previously herein a playback apparatus (such as again the information processing apparatus 100 operating in another mode, or a separate device) for use with a video recording of a writing target may comprise an input processor (such as acquisition unit 200) adapted (for example by suitable software instruction) to obtain a video sequence of the writing target; an input processor (such as acquisition unit 200) adapted (for example by suitable software instruction) to obtain one or more first timestamps corresponding to timings within the video sequence at which candidate received images were stored according to the method of any preceding claim; an input processor (such as acquisition unit 200) adapted (for example by suitable software instruction) to obtain one or more second respective timestamps for the candidate received images that were stored that respectively corresponding to a change start point preceding the storage of a candidate received image; an playback processor operable to play back the video sequence; and at a time in the video sequence corresponding to the second respective timestamp, the playback processor is adapted (for example by suitable software instruction) to overlay on the video the corresponding respective candidate received image that was stored.

It will be appreciated that whilst the above methods and techniques are based on relative changes or amounts within a series of captured images, in principle the technique could use cumulative changes or mounts, either with respect to an initial image, or with respect to predetermined images, such as candidate images that are stored as per the above described embodiments.

However, the use of relative changes may be advantageous, as they provide flexibility for the amount of material written or deleted, without setting or adapting a threshold for a total amount required before recording takes place, or exceptions for not recording material again once the total amount has exceeded such a threshold.

The use of absolute amounts may nevertheless provide an alternative approach by detecting points of inflection within the current total amount of material on the writing target, and saving images corresponding to local and global maxima in that amount, optionally conditional upon whether the drop-off after a maxima exceeds a first threshold (indicative of a significant amount of erasure), and/or whether the increase to a maxima exceeds a second threshold (indicative of a significant amount of writing).

Given the above methods and techniques, advantageously the present invention enables an information processing apparatus and more generally a writing monitoring system comprising the information processing apparatus to selectively store images of a writing target in response to significant acts of change, whether additive or subtractive during the course of writing and/or displaying material on the writing target, and/or during the course of removing or blanking material on the writing target.

Additionally, the present technology may further also be configured as below.

(1)

An information processing apparatus including
a control unit configured to detect change in writing information written on a writing target, and specify an image showing the writing target including the writing information on a basis of the detected change.

(2)

The information processing apparatus according to (1), in which
the control unit determines whether or not the change in the writing information is temporary change on a basis of chronological change in amount of the change in the writing information, and
the control unit specifies the image in a case of determining that the change in the writing information is not temporary change.

(3)

The information processing apparatus according to (2),
in which the control unit determines whether or not the change in the writing information is temporary change on a basis of a result of comparison between the amount of change and a first threshold.

(4)

The information processing apparatus according to (3),
in which the control unit detects a first timing indicating a timing at which the change in the writing information starts, on a basis of the chronological change in the amount of change in the writing information.

(5)

The information processing apparatus according to (4),
in which, in a case where the amount of change is a second threshold or less, the control unit detects a timing at which the chronological change in the amount of change has a predetermined gradient, as the first timing.

(6)

The information processing apparatus according to (5),
in which, after determining that the change in the writing information is not temporary change, the control unit detects a second timing indicating a timing at which the change in the writing information ends, on a basis of a result of comparison between the amount of change and the second threshold.

(7)

The information processing apparatus according to any one of (4) to (6),
in which, in a case where the change in the writing information is deletion of the writing information, the control unit specifies the image corresponding to the first timing.

(8)

The information processing apparatus according to (6),
in which, in a case where the change in the writing information is addition of the writing information, the control unit specifies the image corresponding to the second timing.

(9)

The information processing apparatus according to (6),
in which the control unit detects change in the writing information written on the writing target each time the image is acquired, and the control unit sets the first threshold and the second threshold in accordance with an interval between the acquisitions of the image.

(10)

The information processing apparatus according to any one of (4) to (9),
in which the control unit detects the first timing on a basis of a motion of holding stationery, the motion being made by a writer who writes the writing information on the writing target.

(11)

The information processing apparatus according to (6),
in which the control unit detects the second timing on a basis of a motion of letting go of stationery, the motion being made by a writer who writes the writing information on the writing target.

(12)

The information processing apparatus according to (6),
in which the control unit specifies a change area where the writing target is changed between the first timing and the second timing.

(13)

The information processing apparatus according to any one of (2) to (12),
in which the amount of change is amount of change in the writing information per predetermined period of time.

(14)

The information processing apparatus according to (12) or (13),
in which the control unit associates the image with change area information indicating the change area.

(15)

The information processing apparatus according to (14),
in which the control unit outputs an image in which the change area information is overlapped on the specified image.

(16)

The information processing apparatus according to any one of (1) to (15),
in which the control unit performs control such that the specified image is recorded.

(17)

The information processing apparatus according to any one of (1) to (16),
in which the control unit detects the change by comparing an image showing the writing target including the writing information at a detection target timing with an image showing the writing target including the writing information at a timing a predetermined period of time before the detection target timing.

(18)

The information processing apparatus according to any one of (1) to (17),
in which the image is an image acquired on a basis of an image of the writing target captured by an imaging apparatus.

(19)

An information processing method that is performed by a processor, the information
processing method including
detecting change in writing information written on a writing target, and specifying an image showing the writing target including the writing information on a basis of the detected change.

(20)

A program causing a computer to
detect change in writing information written on a writing target, and specify an image showing the writing target including the writing information on a basis of the detected change.

REFERENCE SIGNS LIST 1 system
100 information processing apparatus
110 acquisition unit
120 first storage unit
130 detection unit
140 second storage unit
150 output control unit
200 input apparatus
300 output apparatus

The invention claimed is:

1. An information processing apparatus, comprising:
an input interface to receive a series of captured images of a writing target; and
processing circuitry configured to
detect a difference between first and second candidate received images of the received series of captured images, the first and second candidate received images being captured at different times, wherein an additive difference is indicative of writing and a subtractive difference is indicative of erasure;
in response to detecting an additive difference, detect whether an additive difference between the first and second candidate received images exceeds a first addition threshold amount; and
in response to detecting that the additive difference between the first and second candidate received images exceeds the first addition threshold amount at a first time, determine, as a particular recording image, a particular candidate received image, of subsequent candidate received images received after the first time, corresponding to a second time, occurring after the first time, when the additive difference between the particular candidate received image and another of the subsequent candidate received images falls below a second addition threshold amount.

2. The information processing apparatus of claim 1, further comprising a memory, wherein the processing circuitry is further configured to store the determined particular recording image in the memory.

3. The information processing apparatus of claim 1, wherein the processing circuitry is further configured to estimate a change rate based on the detected difference between the first and second candidate received images.

4. The information processing apparatus of claim 3, wherein the processing circuitry is further configured to, in response to detecting the additive difference, determine, as a certain recording image, a certain candidate received image corresponding to a time when the estimated change rate previously exceeds one or more of (1) a noise-floor threshold, (2) a predetermined gradient of the change rate, and (3) a writing threshold corresponding to a predetermined amount of writing.

5. The information processing apparatus of claim 1, wherein the processing circuitry is further configured to detect a starting point for the additive difference by detecting motion of an item of stationery associated with an act of writing.

6. The information processing apparatus of claim 1, wherein a predetermined period of time between the first and second candidate received images received by the input interface is longer than an image capture period.

7. The information processing apparatus of claim 1, wherein the processing circuitry is further configured to:
store a video sequence of the writing target, from which the first and second candidate received images were obtained; and
associate, with the stored video sequence, timestamps corresponding to timings within the video sequence at which the first and second candidate received images were stored.

8. An information processing method, comprising:
receiving a series of captured images of a writing target; and
detecting a difference between first and second candidate received image of the received series of captured images, the first and second candidate received images being captured at different times, wherein an additive difference is indicative of writing and a subtractive difference is indicative of erasure;
in response to detecting an additive difference, detecting whether an additive difference between the first and second candidate received images exceeds a first addition threshold amount; and
in response to detecting that the additive difference between the first and second candidate received images exceeds the first addition threshold amount at a first time, determining, as a particular recording image, a particular candidate received image, of subsequent candidate received images received after the first time, corresponding to a second time, occurring after the first time, when the additive difference between the particular candidate received image and another of the subsequent candidate received images falls below a second addition threshold amount.

9. The information processing method of claim 8, further comprising storing, in a memory, the determined particular recording image.

10. The information processing method of claim 8, further comprising estimating a change rate based on the detected difference between the first and second candidate received images.

11. The information processing method of claim 10, further comprising, in response to detecting the additive difference, determining, as a certain recording image, a certain candidate received image corresponding to a time when the estimated change rate previously exceeds one or more of (1) a noise-floor threshold, (2) a predetermined gradient of the change rate, and (3) a writing threshold corresponding to a predetermined amount of writing.

12. The information processing method of claim 8, further comprising detecting a starting point for the additive difference by detecting motion of an item of stationery associated with an act of writing.

13. The information processing method of claim 8, wherein a predetermined period of time between the first and second candidate received images received in the receiving step is longer than an image capture period.

14. The information processing method of claim 8, further comprising:
storing a video sequence of the writing target, from which the first and second candidate received images were obtained; and
associating, with the stored video sequence, timestamps corresponding to timings within the video sequence at which the first and second candidate received images were stored.

15. A non-transitory computer-readable medium storing a program that, when executed by processing circuitry, causes the processing circuitry to perform an information processing method, comprising:

receiving a series of captured images of a writing target; and detecting a difference between first and second candidate received image of the received series of captured images, the first and second candidate received images being captured at different times, wherein an additive difference is indicative of writing and a subtractive difference is indicative of erasure;

in response to detecting an additive difference, detecting whether an additive difference between the first and second candidate received images exceeds a first addition threshold amount; and in response to detecting that the additive difference between the first and second candidate received images exceeds the first addition threshold amount at a first time, determining, as a particular recording image, a particular candidate received image, of subsequent candidate received images received after the first time, corresponding to a second time, occurring after the first time, when the additive difference between the particular candidate received image and another of the subsequent candidate received images falls below a second addition threshold amount.

16. The non-transitory computer-readable medium of claim 15, wherein the method further comprises storing, in a memory, the determined particular recording image.

17. The non-transitory computer-readable medium of claim 15, wherein the method further comprises estimating a change rate based on the detected difference between the first and second candidate received images.

18. The non-transitory computer-readable medium of claim 17, wherein the method further comprises, in response to detecting the additive difference, determining, as a certain recording image, a certain candidate received image corresponding to a time when the estimated change rate previously exceeds one or more of (1) a noise-floor threshold, (2) a predetermined gradient of the change rate, and (3) a writing threshold corresponding to a predetermined amount of writing.

19. The non-transitory computer-readable medium of claim 15, wherein the method further comprises detecting a starting point for the additive difference by detecting motion of an item of stationery associated with an act of writing.

20. The non-transitory computer-readable medium of claim 15, wherein a predetermined period of time between the first and second candidate received images received in the receiving step is longer than an image capture period.

* * * * *